United States Patent [19]
Griffith et al.

[11] Patent Number: 5,646,806
[45] Date of Patent: Jul. 8, 1997

[54] EDGE TENSIONING SLOPING TAPE GUIDE FOR ARCUATELY SCANNING TAPE DRIVE

[75] Inventors: Neil J. Griffith; James U. Lemke, both of San Diego; James Crosby, Santa Fe, all of Calif.

[73] Assignee: Minnesota Mining And Manufacturing Company, St. Paul, Minn.

[21] Appl. No.: 646,842

[22] Filed: May 8, 1996

Related U.S. Application Data

[63] Continuation of Ser. No. 341,670, Nov. 17, 1994, abandoned, which is a continuation-in-part of Ser. No. 193,179, Feb. 9, 1994, abandoned.

[51] Int. Cl.$^6$ ............................................. G11B 15/60
[52] U.S. Cl. ........................... 360/130.22; 360/130.21
[58] Field of Search ........................ 360/130.22, 130.21, 360/130.23, 130.24

[56] References Cited

U.S. PATENT DOCUMENTS

| | | | |
|---|---|---|---|
| 2,750,449 | 6/1956 | Thompson et al. | 179/100.2 |
| 2,772,328 | 11/1956 | Lyon | 179/100.2 |
| 2,859,973 | 11/1958 | Runge | 274/4 |
| 2,924,668 | 2/1960 | Hoshino et al. | 179/100.2 |
| 2,941,741 | 6/1960 | Bilsback | 242/55.13 |
| 3,320,371 | 5/1967 | Bach | 179/100.2 |
| 3,692,255 | 9/1972 | Von Behren | 242/192 |
| 3,735,939 | 5/1973 | Inaga | 242/198 |
| 3,900,172 | 8/1975 | Kamaya | 242/198 |
| 3,972,074 | 7/1976 | Vogel | 360/130.22 |

(List continued on next page.)

FOREIGN PATENT DOCUMENTS

| | | | |
|---|---|---|---|
| 0200536 | 11/1986 | European Pat. Off. | 360/130.23 |
| 53-118008 | 10/1978 | Japan | 360/130.22 |
| 58-35758 | 3/1983 | Japan | 360/130.22 |
| 59-231703 | 12/1984 | Japan | G11B 5/008 |
| 61-063913 | 4/1986 | Japan | G11B 5/52 |
| 2240855 | 9/1990 | Japan | G11B 15/467 |
| 3230383 | 10/1991 | Japan | G11B 25/04 |
| 6-139662 | 5/1994 | Japan | G11B 15/61 |

OTHER PUBLICATIONS

E. Autino et al., "Compatibility of Silicon Planar Heads with Conventional Thin Film Heads in Hard Disk Drives," IEEE Transactions on Magnetics, vol. 28, No. 5, Sep., pp. 2124–2126, 1992.

J. Lazzari et al., "A New Thin Film Head Generation IC Head," IEEE Transactions on Magnetics, vol. 25, No. 5, Sep., 1989.

*Primary Examiner*—John H. Wolff
*Attorney, Agent, or Firm*—Baker, Maxham, Jester & Meador

[57] ABSTRACT

A sloping tape guide is provided for an arcuately scanning tape drive so that tension per unit width of a magnetic tape is equalized in the head/tape contact zone on a front face of a head assembly of the arcuate scanner. The tape wraps over the circular edge of the magnetic head assembly. As a consequence, the tension per unit width is higher at the center of the tape that at the edges. The low tension at the edges of the tape results in poor head to tape contact in these regions and consequently unacceptable signal performance. This invention overcomes these difficulties by providing a means to equalize tension per unit width across the tape. The sloping tape guide has a front sloping flat surface which is bounded by top and bottom edges and first and second side edges, the first side edge being closer to the lat surface slopes rearwardly from its first edge to its second edge away from the periphery of the head assembly. The second edge is concave so that top and bottom edge portions of the sloping surface have a longer path length than a center portion of the sloping surface. By wrapping the tape around the second edge, the top and bottom edge portions of the magnetic tape traverse a longer tape path length than the middle portion of the magnetic tape thereby increasing tension per unit width at the edge portions of the tape as the tape makes transducing contact with the magnetic heads scanning across the width of the tape. Deadband portions at top and bottom edges of the tape are thereby eliminated to increase the efficiency of the arcuate scanner.

63 Claims, 19 Drawing Sheets

U.S. PATENT DOCUMENTS

| | | | |
|---|---|---|---|
| 3,980,255 | 9/1976 | Serizawa | 242/198 |
| 4,012,793 | 3/1977 | Blanding | 360/130.23 |
| 4,249,222 | 2/1981 | Iwasaki | 360/130.23 |
| 4,833,556 | 5/1989 | Kosarko et al. | 360/130.34 X |
| 5,010,432 | 4/1991 | Fukushima et al. | 360/130.22 X |
| 5,062,020 | 10/1991 | Osanai | 360/130.34 |
| 5,175,660 | 12/1992 | Mitsuhashi et al. | 360/130.34 |
| 5,191,497 | 3/1993 | Saito et al. | 360/130.34 |
| 5,289,330 | 2/1994 | Wade | 360/122 |

EDGE TENSIONING SLOPING TAPE GUIDE FOR ARCUATELY SCANNING TAPE DRIVE

CROSS-REFERENCE TO RELATED APPLICATION

This is a continuation of application Ser. No. 08/341,670 filed Nov. 17, 1994, now abandoned which is a continuation in-part application of U.S. patent application Ser. No. 08/193,179 now abandoned entitled "Arcuate Scanning Tape Drive" filed on Feb. 9, 1994 by James U. Lemke, et al. and commonly assigned to Minnesota Mining and Manufacturing Company, which application is incorporated by reference herein.

BACKGROUND OF THE INVENTION

1. Field of the Invention

The present invention relates to a tape guide for an arcuately scanning tape drive and more particularly to a tape guide which has a sloping surface in close proximity to a rotating head assembly for equalizing tension per unit width across the tape as the tape makes transducing contact with magnetic heads on the head assembly.

2. Description of Related Art

The most commonly-used direct access storage device in portable and desktop computer systems is the Winchester disk of three and one-half inches or less. The three and one-half inch Winchester disk has a capacity of storing in excess of 40 megabytes of data. Prudent computer system management requires that the data on a Winchester disk be periodically copied (backed-up) so that it will not be lost in the event of a head crash. Further, it may be desirable to preserve Winchester-stored data in an archive or library or in a medium which can be manually transported to another computer system. Also, security requirements may necessitate erasing a disk and/or storage of transportable media in secure locations. Magnetic tape is widely used for these purposes.

Most commercially important magnetic tape drive systems are based on the reel-to-reel transport of magnetic tape past a fixed recording/reading location where a stationary single- or multiple-track head is positioned. Recording and playback in such a system is done longitudinally with respect to the tape by moving the tape on its longitudinal axis past a record/playback location where a head mechanism is located. In a stationary head tape drive, the head mechanism consists of a plurality of heads which are transversely aligned and fixedly positioned with respect to the tape during record and playback. Information is placed on the tape in the form of a plurality of parallel, longitudinally-extending tracks; the areal density of information stored on the tape is increased by reducing the dimensions of the heads and the inter-head spacing on the head mechanism. However, small head size and minimal inter-head spacing demand great precision in the manufacture of head components. As a result, the manufacturing tolerances of the tape drive, primarily the mechanical tolerances of the head assemblies, have become increasingly stringent and more difficult and expensive to achieve. Further, the proliferation of heads is reflected in additional read and write channel electronics for each head which also adds to the expense of these drives.

As is known, in the video recording art, modem high-capacity, high-quality tape drives employ head mechanisms which rotate magnetic heads with respect to a moving tape. The high rotational speed of the "rotary head" recorders steps away from the requirement in stationary head technology for a plurality of transversely-aligned heads and associated electronics and, therefore, obviates the problems attendant with manufacture and assembly of stationary head mechanisms. Servoing is employed in the dominant classes of rotary head tape drives to align rotating heads with tracks on the tape. The servoing techniques developed for these classes of tape drives enhance head/track alignment and result in substantial reduction in track width and inter-track spacing. Consequently, rotary head tape drives enjoy a significant advantage over stationary head tape drives in areal density.

One type of rotary head drive is an arcuately scanning tape drive which employs a circular head assembly. In this head assembly a plurality of read and write magnetic heads are mounted on a front end of a cylindrical dram in substantially a circle about a center of the drum. During operation, the drum rotates and the tape moves across the front end in contact with the heads. The result is a sequence of arcuately-shaped tracks on the tape which are transverse to the longitudinal axis of the tape. Prior art arcuately scanning tape drives are described, for example, in: U.S. Pat. No. 2,750,449 of Thompson, et al.; U.S. Pat. No. 2,924,668 of Hoshino, et al.; U.S. Pat. No. 3,320,371 of Bach; U.S. Pat. No. 4,636,886 of Schwarz; U.S. Pat. No. 4,647,993 of Schwarz, et al; and U.S. Pat. No. 4,731,681 of Ogata.

In an arcuately scanning tape drive, a magnetic head commences a write or read function at edge of the tape and continues to write or read until it leaves the opposite edge of the tape. During this write or read function it is imperative that good transducing contact be maintained between the head and the tape as the head arcs across the width of the tape. Any region of the tape where there is inadequate contact is a deadband region which produces signal loss during recording or playback.

Arcuately scanning tape drives typically have inadequate contact near the edges of the magnetic tape. This results from a low tensile-stress field at the tape edges because the tape is wrapping around an annular edge. As a consequence, the center of the tape has higher tension than the edges and head/tape contact is adequate in the center becoming less as the head moves out to the tape edges. The same thing occurs with a magnetic tape. When the head assembly of an arcuate scanner is forced against a magnetic tape to implement the read and write functions there is not enough edge tension to maintain the desired contact. Resultantly, the magnetic tape has top and bottom deadband regions which effectively reduce the usable width of the tape. This condition seriously affects the efficiency of the arcuately scanning tape drive.

SUMMARY OF THE INVENTION

We have discovered a way of providing tape-head interface contact between magnetic heads and edge portions of a magnetic tape. This is accomplished by a novel arrangement for increasing the tension per unit width of the tape in the edge regions so that the available tension is redistributed across the width of the tape, particularly at the tape edges. The invention provides a tape guide, hereinafter referred to as a sloping tape guide, which increases the strand length of the edge regions of the tape relative to a center region of the tape. The magnetic tape engages a sloping surface of the sloping tape guide just after it engages the magnetic heads of the head assembly. The head assembly has a front face where the magnetic heads engage the magnetic tape, the sloping surface of the sloping tape guide sloping rearwardly from the front face of the head assembly. From the front face of the head assembly, the magnetic tape immediately wraps on two edges which partially bound the sloping surface of the sloping tape guide. The sloping surface of the sloping tape guide is a plane bounded by a straight edge which is perpendicular to the direction of tape travel, an arc of a circle where the arc is tangent to the center of the straight edge at the nominal center of the tape path and by two parallel edges separated by a distance greater than the tape width and which are perpendicular to the straight edge. The distance along the tape direction from the arc to the straight edge is therefore greater at the edges and smallest at the center of the tape. In the preferred embodiment the carved edge is an arc which has the same radius as the circular head assembly. The arc of a periphery portion of the head assembly and the arc of the side edge of the sloping surface curve in opposite directions when aligned along a longitudinal axis of the tape. For this reason the curved edge of the sloping portion of the sloping tape guide is referred to as having a reverse curve with respect to the curvature of the periphery of the head assembly.

The unique configuration of the sloping surface of the sloping tape guide and the wrapping of the tape on this guide causes edge portions of the tape to engage a longer contact length along the sloping surface of the guide than a center region of the tape immediately after the tape contacts the magnetic heads of the head assembly. This arrangement increases the tension per unit width of the tape at its top and bottom edges. By making a side edge of the sloping surface an arc which has the same radius as the head assembly the tension per unit width of tape is redistributed advantageously across its width particularly at the edges. This is a sought for condition when the tape makes contact with the magnetic heads. It is therefore important that the sloping tape guide be located close to the place of tape/head contact so that there is minimal decay in uniformity of tension per unit width as the tape wraps from the sloping surface of the sloping tape guide to the head assembly. This has been accomplished by mounting the sloping tape guide on a shroud which positions the sloping surface as close as possible to the periphery of the head assembly.

The invention also includes cooperation of the sloping tape guide with another tape guide on the shroud as well as with tape guides on the head assembly. Tape guides for the head assembly may include a pair of spaced apart concentric ridges with an annular recess therebetween. The ridges may have front surfaces which slope rearwardly toward the periphery of the head assembly and the magnetic heads may be mounted in the annular recess. In a preferred embodiment of the invention the magnetic tape wraps from the sloping tape guide to the outer annular ridge, thence to the magnetic heads, thence to the inner annular ridge and thence to a guide on the shroud which is located diametrically opposite the sloping tape guide on the other side of the head assembly. This spaces the magnetic tape away from the rotating magnetic heads which are located diametrically opposite other rotating magnetic heads which are contacting the tape. This arrangement optimizes the tension per unit width of tape at the head/tape interface, where transducing takes place, so as to provide good recording and playback signals from the magnetic tape.

An object of the present invention is to normalize tension per unit width of a magnetic tape as the magnetic tape makes transducing with magnetic heads moving across the tape.

Another object is to increase the tension of unsupported edge portions of a magnetic tape so that the edge portions make good transducing contact with magnetic heads which rotate about a large radius across the tape.

A further object is to eliminate deadband regions of a magnetic tape caused by a magnetic tape not making transducing contact with magnetic heads rotating across the magnetic tape.

Yet another object is to improve transducing contact between the width of a magnetic tape and magnetic heads rotating thereacross.

Still another object is to provide a sloping tape guide which cooperates with tape guides on a head assembly of an arcuate scanner for improving transducing contact between the magnetic tape and magnetic heads rotating thereacross.

Still a further object is to provide a sloping tape guide adjacent one side of a rotating head assembly which cooperates with a tape guide on an opposite side of the head assembly for improving transducing contact between the magnetic tape and magnetic heads rotating thereacross.

Still another object is to accomplish the previous object with an integral element which also positions a cartridge carrying the tape so that the tape is positioned for transducing contact with magnetic heads on the head assembly by providing for the required tape wrap on the sloping tape guide irrespective of manufacturing tolerances for the cartridge.

Still a further object is to provide a sloping tape guide adjacent one side of a rotating head assembly which further cooperates with a curved tape guide on an opposite side of the head assembly and which further cooperates with one or more guides on the rotating head assembly for improving transducing contact between the magnetic tape and magnetic heads rotating thereacross.

Other objects and advantages of the invention will become apparent and appreciated by one skilled in the art upon reading the following detailed description taken together with the below described drawings.

DETAILED DESCRIPTION OF THE PREFERRED EMBODIMENTS

Figure 1:
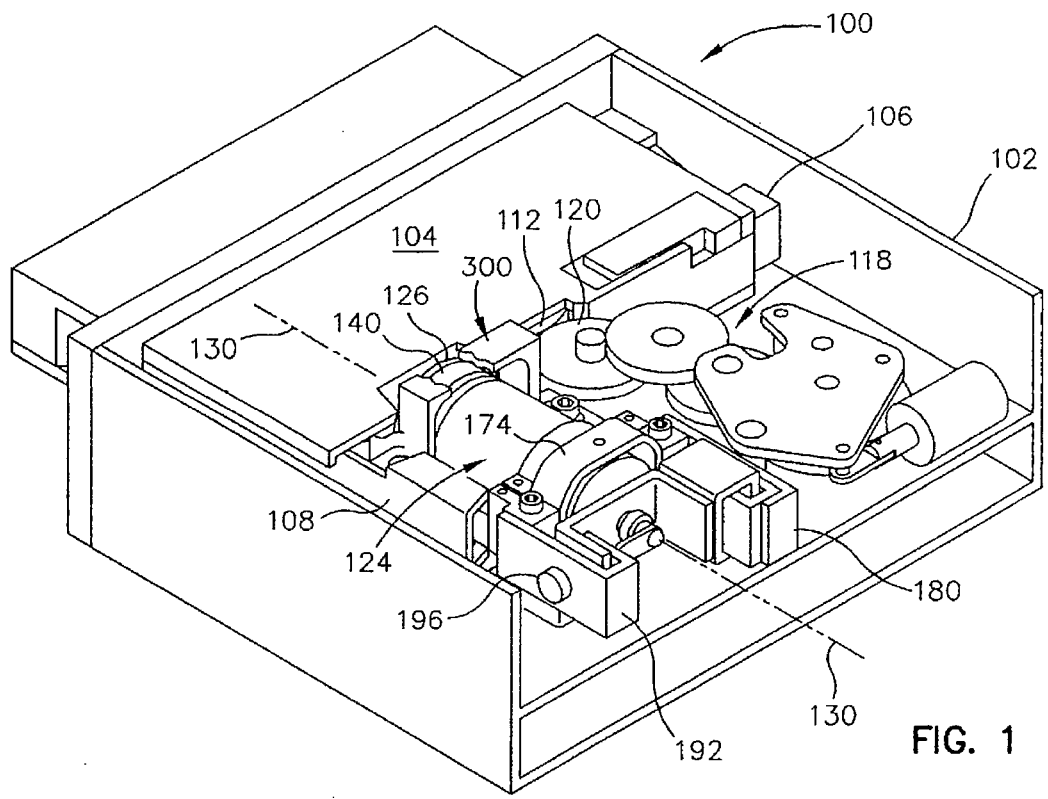
FIG. 1 is an isometric illustration of an arcuately scanning tape drive which employs the integrated head assembly of the present invention.

The invention concerns a tape drive used to back up the internal and direct access storage of a computer system or for general purpose recording of information signals. As is known, such a tape drive is frequently used to record data from the internal and direct access storage facilities so that such data can be used in the event of a malfunction of those facilities or a loss of data in the computer system. The process of "backing-up" involves the copying of data onto a tape for safekeeping.

For ease and convenience of handling, magnetic tapes are usually provided in containers such as cartridges. A cartridge typically consists of a housing containing magnetic tape wound on supply and take-up reels. The cartridge is receivable in a mechanism called a "tape drive" which has the capacity to record or read back data on the cartridge tape. Currently, cartridges are used in miniature tape drives of portable and desktop computer systems. Commercially available cartridges are manufactured by, or under license from, Minnesota Mining and Manufacturing Company (3M) and are identified as DC 1000, DC2000, and so on. A cartridge of this type is disclosed in U.S. Pat. No. 3,692,255, assigned to 3M, which is incorporated by reference herein.

This cartridge includes a narrow tape which is approximately one-quarter of an inch wide. The cartridge body has a flat, rectangular configuration measuring approximately 9/16ths of an inch by approximately 2 and 3/8ths inches in width by approximately 3 and 3/16ths inches in length. The cartridge has a metal base plate which inhibits warpage and supports precision alignment of the cartridge in a tape drive. The magnetic tape in the cartridge is wound between a supply and take-up reel rotatably mounted between the base plate and a plastic top cover. The winding is accomplished utilizing a belt capstan roller which may be engaged by a capstan drive roller of the tape drive. The belt capstan roller drives the belt which engages the tape pack on each of the tape reels. The cartridge further has a hinged tape access door which is opened upon insertion into a tape drive in order to expose the tape for recording and playback by a read/write head assembly.

The invention, which is described below, was conceived in order to take advantage of the small size of a cartridge while enhancing the storage capacity of the tape beyond that achievable in conventional stationary head drives. Rotary head technology of the arcuate scan type is employed by the invention for this purpose in the manner illustrated in FIGS. 1–3. While the invention is described in combination with a belt-driven cartridge, it can be used with any tape advancing mechanism. Thus, the inventor contemplates its use in combination with non-belt-driven cartridges, reel-to-reel setups, for example. Moreover, although the principal motivation for making the invention was to better serve the backup function, the inventor does not intend this to be the sole use to which it is put nor is the invention to be limited to the physical cartridge sizes or tape widths described herein.

Arcuately Scanning Tape Drive

Figure 2:
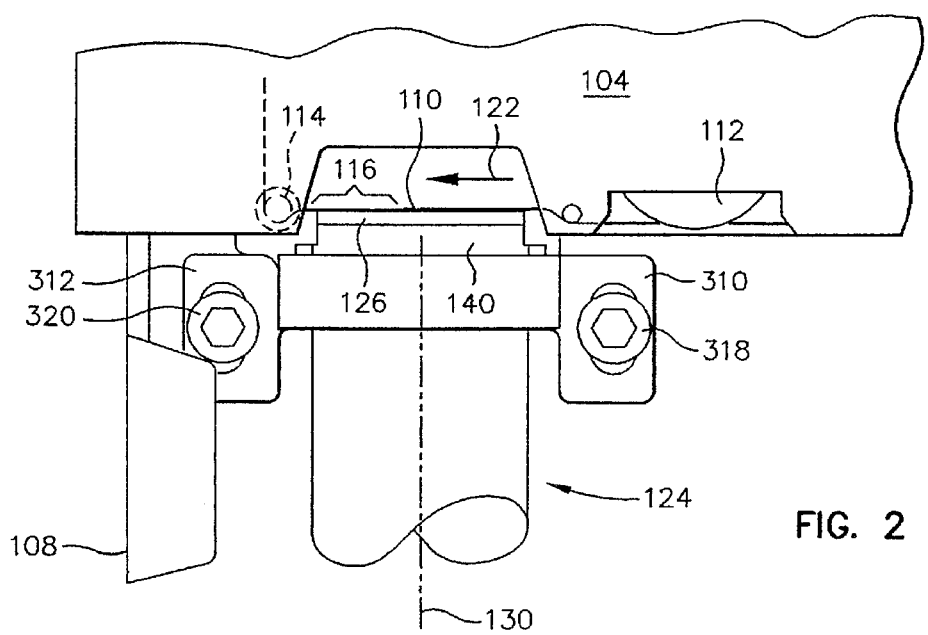
FIG. 2 is a top view of a portion of the arcuately scanning drive showing the integrated head assembly in engagement with a magnetic tape at a recording location.
Figure 3:
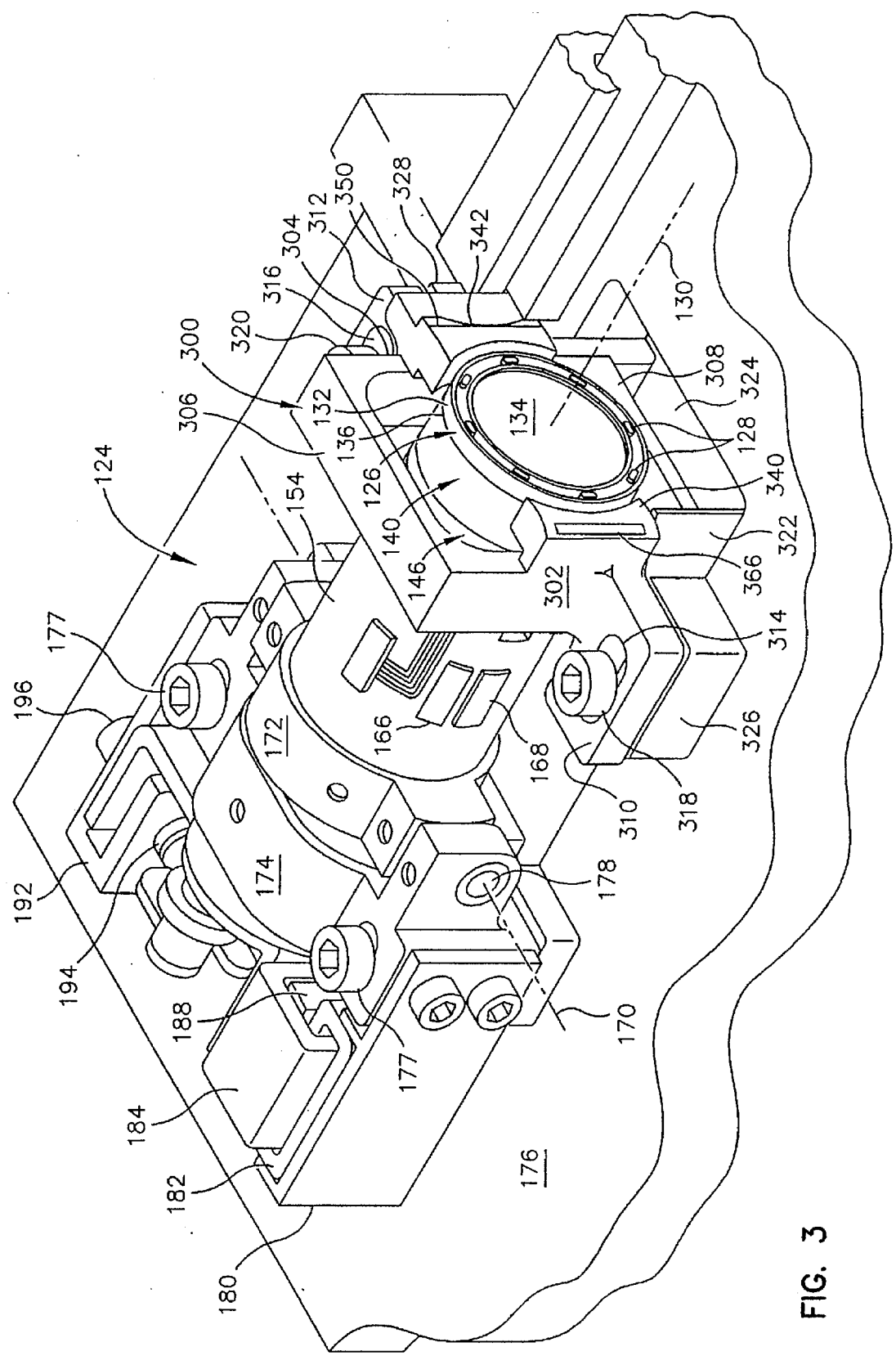
FIG. 3 is an isometric view of the arcuately scanning tape drive.

In FIGS. 1–3, a miniature tape drive 100 having a frame 102 receives a cartridge 104 of the double-reel type. The tape drive 100 includes a conventional cartridge loading mechanism 106 which receives the cartridge 104, opens the tape cover 108 to expose the tape 110, and positions the tape for record and playback. The tape is driven longitudinally when a rotary force is applied to the tape capstan roller 112. The cartridge includes a stationary main guide pin 114. The main guide pin 114 is attached to the metal base plate of the cartridge adjacent the tape cover 108. The cartridge mechanism positions the tape 110 on the guide pin 114; the tape then travels right to left through a substantially planar record/playback location 116. The rotary force for longitudinally advancing the tape is applied to the tape capstan roller 112 by means of a transmission assembly 118. For the purposes of this description, the transmission mechanism 118 includes a capstan drive roller 120 which engages the tape capstan roller 112 and, when rotated, causes the tape 110 to advance longitudinally through the record/playback location 110. Alternatively, the transmission mechanism can be eliminated and the drive roller 120 can be directly connected to the drive shaft of a multi-speed motor.

As the tape 110 advances longitudinally in the direction indicated by the arrow 122 through the record/playback location 116, data is recorded ("written") on or read ("played back") from the tape by means of a rotary scanner 124. At the forward end of the rotary scanner there is mounted a head assembly 126 which carries a plurality of magnetic heads 128. The head assembly is rotated on an axis of rotation 130 which extends through its center. When the head assembly 126 rotates, the magnetic heads 128 are rotated on a circular transducing path. The head assembly 126 is positioned so that when the magnetic heads 128 rotate on the circular transducing path, they trace out ("scan") a sequence of substantially arcuately-shaped tracks across the tape 110. The sequence of tracks extends longitudinally along the tape and each arcuate track of the sequence is scanned transversely to the longitudinal axis of the tape, beginning near one edge of the tape and ending near the opposite edge.

Figure 4:
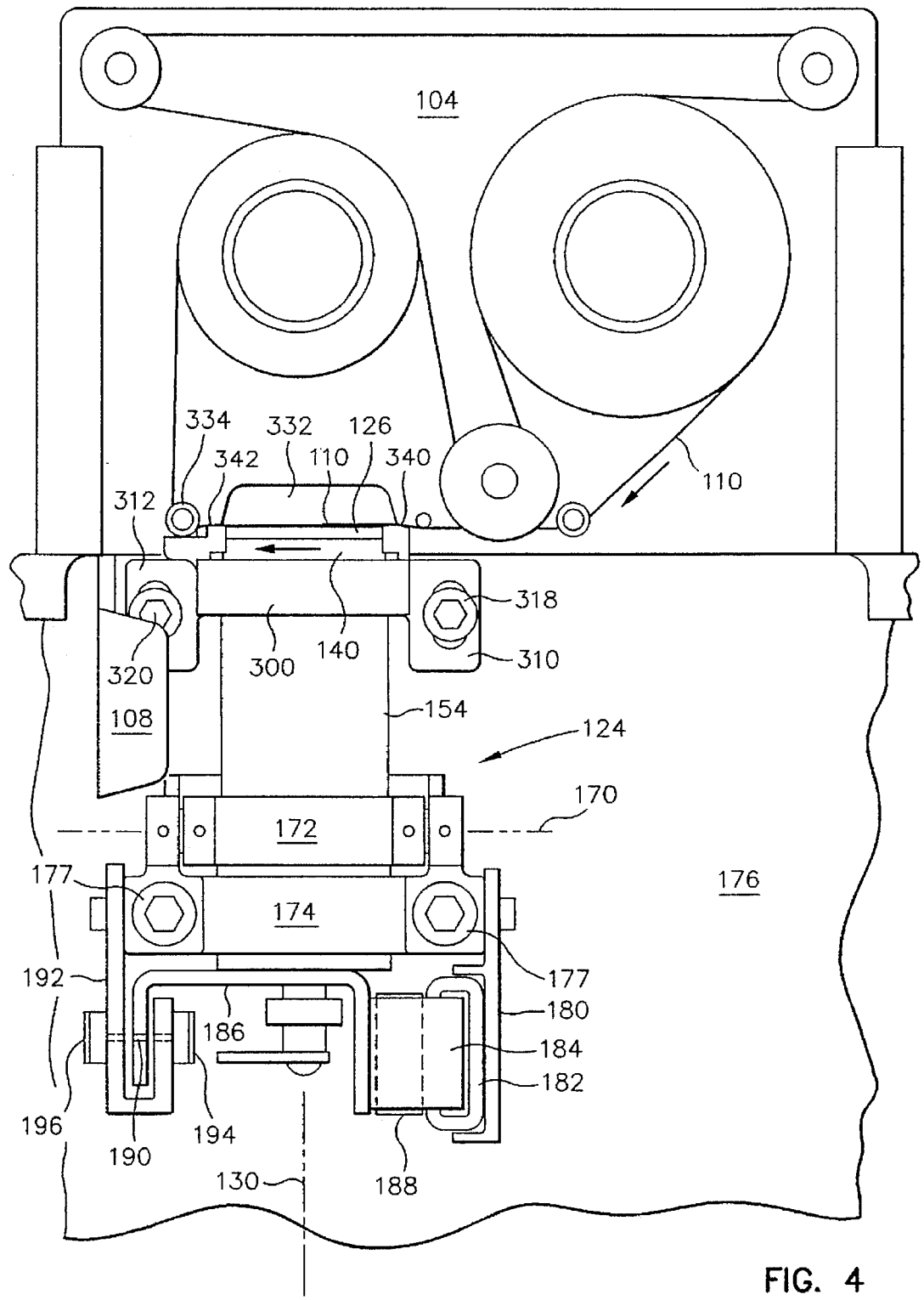
FIG. 4 is a top view of the arcuately scanning tape drive showing engagement of the head assembly with a magnetic tape at a recording location.
Figure 5:
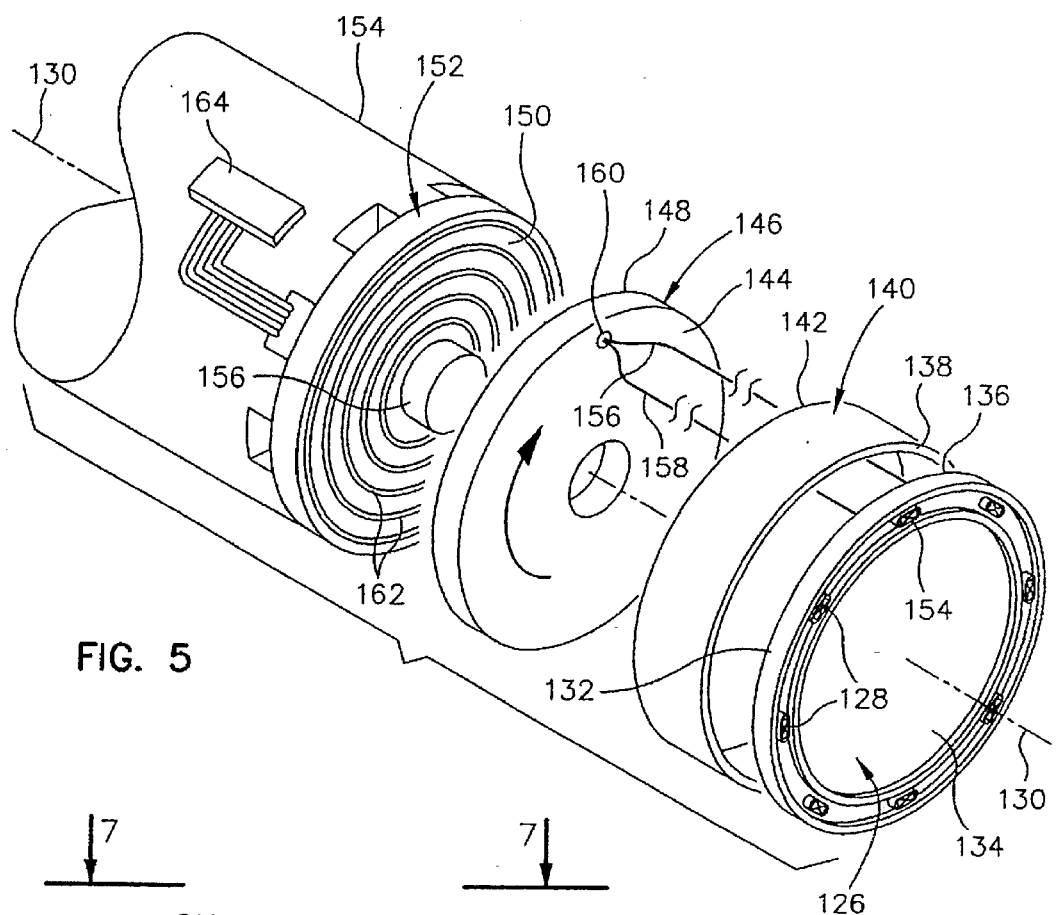
FIG. 5 is an exploded view of the head assembly end of the drive of FIG. 3.

As shown in FIGS. 3–5, the head assembly 126, when built according to the invention, comprises a substantially circular disk 132 which has front and rear substantially flat surfaces 134 and 136. The rear surface 136 of the disk is connected to a front circular edge 138 of a thin walled annular drum 140. A rear edge 142 of the annular drum is connected to a front face 144 of a rotor plate 146, the rotor plate 146 having a rear face 148 which faces a front face 150 of a stator plate 152. The stator plate 152 is fixedly connected to a forward end of a motor housing 154. A motor shaft 156 slidably extends through the stator plate 152 and is centrally connected to the rotor plate 146 which causes the drum 140 and head assembly 126 to rotate about the axis 130. All of the connections as well as other connections described herein can be made by adhesive bonding. It should be understood that the disk 132, the drum 140 and the rotor plate 146 or the disk 132 and the drum 140 could be a single piece. The term "disk" used in this description is to include all possible embodiments.

Electrical signals are transferred to and from the magnetic heads 128 on the disk 132 by the rotor 146 and the stator 152. When the head assembly 126 is rotated, electrical signals are written to and read from arcuate tracks on the magnetic tape 110 by means of signal paths which include electromagnetic flux couplings between the rotor 146 and stator 152. The magnetic head 128 has a structure which induces or receives flux signals across a gap (shown later). The head structure transitions to signal leads 156 and 158 which feed through a small hole 160 in the rotor 146 and which are laid in a circular groove (not shown) in the rear face 148 of the rotor to form one-half of a winding pair therein; the other half of the winding pair being in the stator 152. The stator 152 includes corresponding concentric grooves 162 which are aligned with the concentric grooves (not shown) on the rear surface 148 of the rotor 146 and in which wires are wound to form stationary windings which electromagnetically couple with the rotating windings in the grooves of the rotor 146. Alternatively, for higher performance versions of the tape drive, read and write electronics may be mounted on rotating drum 140. In this case head leads 156, 158 will connect, as appropriate, to read or write electronics. In turn, input and output signals as well as power for the rotating electronics will be coupled electromagnetically through the rotor 148 and stator 152. The windings in the stator 152 are connected to wiring pads on the outer surface of the motor housing 154 for convenient electrical connection through wiring to circuit elements (not shown) for processing. One such wiring pad is indicated by reference numeral 164. Sensors 166 and 168 (see FIG. 3) are also mounted to the housing 154 to provide, respectively, an index signal each time a full rotation of the shaft 156 is made and a shaft rotational speed signal.

The scanner 124 is positioned adjacent the recording location 116 where the head assembly 126 faces the tape 110 to which a sequence of arcuate tracks is to be written. The head assembly 126 is adjusted with respect to the edges of the tape by pivoting the housing 154 about a pivot axis 170. For pivoting the housing 154, a pivot ring 172 is fixed to the outer surface of the housing 154. The pivot ring 172 is pivotally attached to a frame 174 by flexible pivots that are compliant in rotation about the pivot axis but stiff in all other axes and in translation. The frame 174 is secured to a bottom plate 176 of the housing 102 by the bolts 177. One flexible pivot for rotatably attaching the pivot ring 172 to the frame 174 is indicated by 178 in FIG. 3. As best seen in FIGS. 3 and 4, a bracket 180 is fixed to the stationary frame 174 and carries on its rear portion a conventional voice coil 182 with an open center. A U-shaped bracket 184 is affixed to the rear of the motor housing 154 by another U-shaped bracket 186. The U-shaped bracket 184 has one leg which is received in the center of the voice coil 182 and another leg to which a permanent magnet 188 is attached. Current through the voice coil 182 sets up a magnetic field in its open center which is conducted in the U-shaped bracket 184 to the permanent magnet 188. As will be appreciated by those skilled in the art, an electromotive force will be exerted on the U-shaped bracket 184 and its attached magnet 188 having a magnitude determined by the magnitude of the field induced in the coil 182. The scanner 124 will be pivoted on the pivot axis 170 by an amount which depends upon the relative strengths of the voice coil 182 field and the field of the permanent magnet 188, thereby selectively positioning the axis of rotation 130 on which the shaft 156, the rotor 146, the drum 140 and the head assembly 126 rotate.

The amount by which the scanner 124 has been tilted is detected by a standard LED/bicell arrangement. In this regard, the U-shaped bracket 186, which is fixed to the rear of the motor housing 154, has a small hole 190 bored through one of its legs as shown in FIG. 4. This leg and the hole 190 move within the two legs of a U-shaped bracket 192 which is stationary, being fixed to the frame 174. An LED 194 is fixed to one leg of the U-shaped bracket 192. A bicell 196 is mounted to the other leg of the bracket 192 and, when the LED 194 is on, it is illuminated through aligned holes in the legs of the bracket 192. The hole 190 in the bracket 186 provides a variable light transmission path between the LED 194 and the bicell 196 whose variance is measured by the bicell 196. The signal produced by the bicell 196 therefore is indicative of an amount by which the scanner 124 has been tilted.

Figure 6:
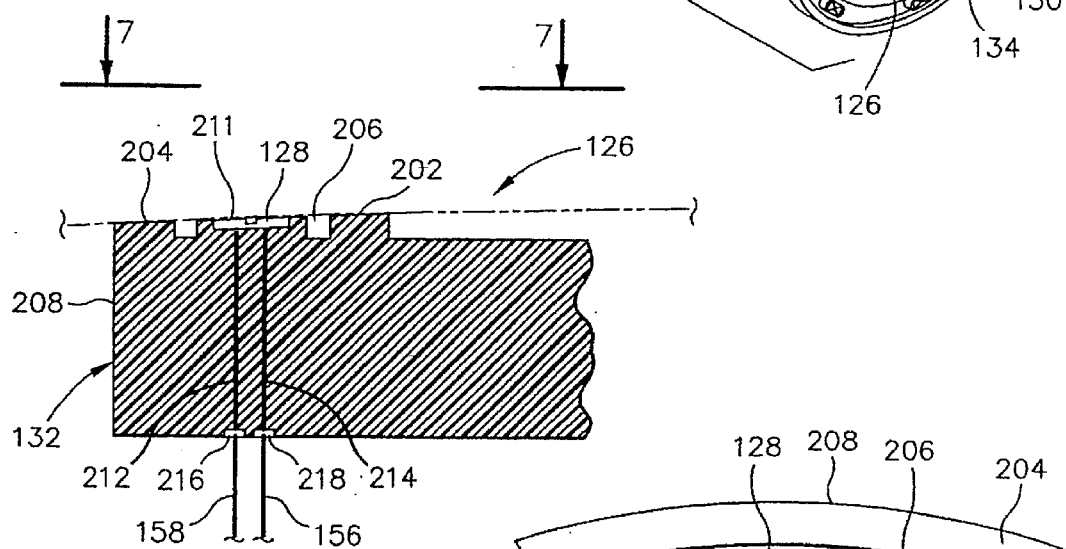
FIG. 6 is an enlarged view of a portion of the head assembly.
Figure 7:
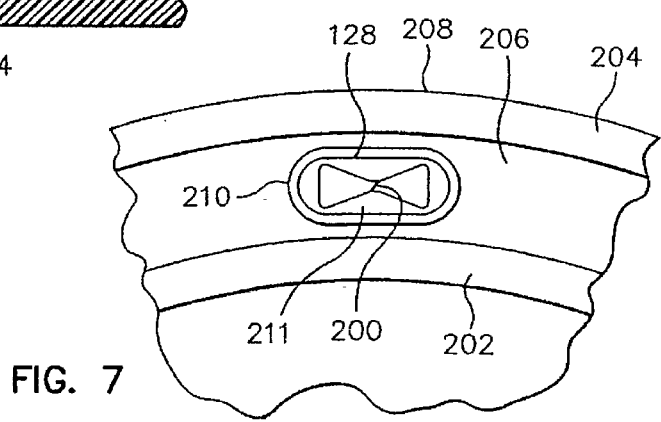
FIG. 7 is a view taken along plane 7—7 of FIG. 6.

A portion of the disk 132 is illustrated in FIG. 6 along with a magnetic head 128 which represents either a read head or a write head. As can be seen in FIG. 7, the magnetic head has an elongated gap 200 which extends at an angle to a radius of the disk, the radius extending through the center of the gap. This angle will be important in explaining the alignment of the read and write gaps hereinbelow.

As shown in FIGS. 6 and 7, the disk 132 may have inner and outer annular ridges 202 and 204 with an annular trench or recess 206 therebetween. The double annular ridge scheme is preferred for numerous embodiments of the present invention to insure good transducing engagement between a magnetic head 128 and a moving magnetic tape across the head assembly. In a preferred embodiment, the inner and outer annular ridges 202 and 204 have forward surfaces which are coplanar and which slope rearwardly with respect to the scanner 124 toward a circular periphery 208 of the disk. The magnetic head 128 is centrally located within the annular recess 206. In a preferred embodiment, the magnetic head 128 is mounted in an island 210. The island may have a front surface which is substantially coplanar with the forward surfaces of the inboard and outboard annular ridges 202 and 204 and which slopes rearwardly, with respect to the scanner 124, toward the circular periphery 208 of the disk. The rearward slope of the forward surfaces of the inner and outer annular ridges and the islands may be on the order of 3°. Still further, in the preferred embodiment, a head surface 211 of the magnetic head 128 may project forwardly (shown later), with respect to the scanner, a slight distance from the front surface of the island 210. This distance can be in the order of 0.5 to 1 mil. The slight projection of the head surface of the magnetic head 128 insures a good transducing contact between the head surface and the magnetic tape 110 moving thereacross.

As will be explained in more detail hereinafter, the magnetic head is an inductive type which comprises a coil which is inductively coupled to a pair of pole pieces, the pole pieces forming the gap 200. The coil is connected to the outside world by a pair of vias 212 and 214 in the disk which extend from the coil, near the front face of the island, to a rear surface of the disk where the vias terminate in pads 216 and 218. These pads are connected to the wires 156 and 158 which are connected to other components, as explained hereinabove. In a preferred embodiment of the invention, the disk 132 is a substrate upon which thin film magnetic heads 128 are constructed as will be explained in more detail hereinbelow.

Figure 8:
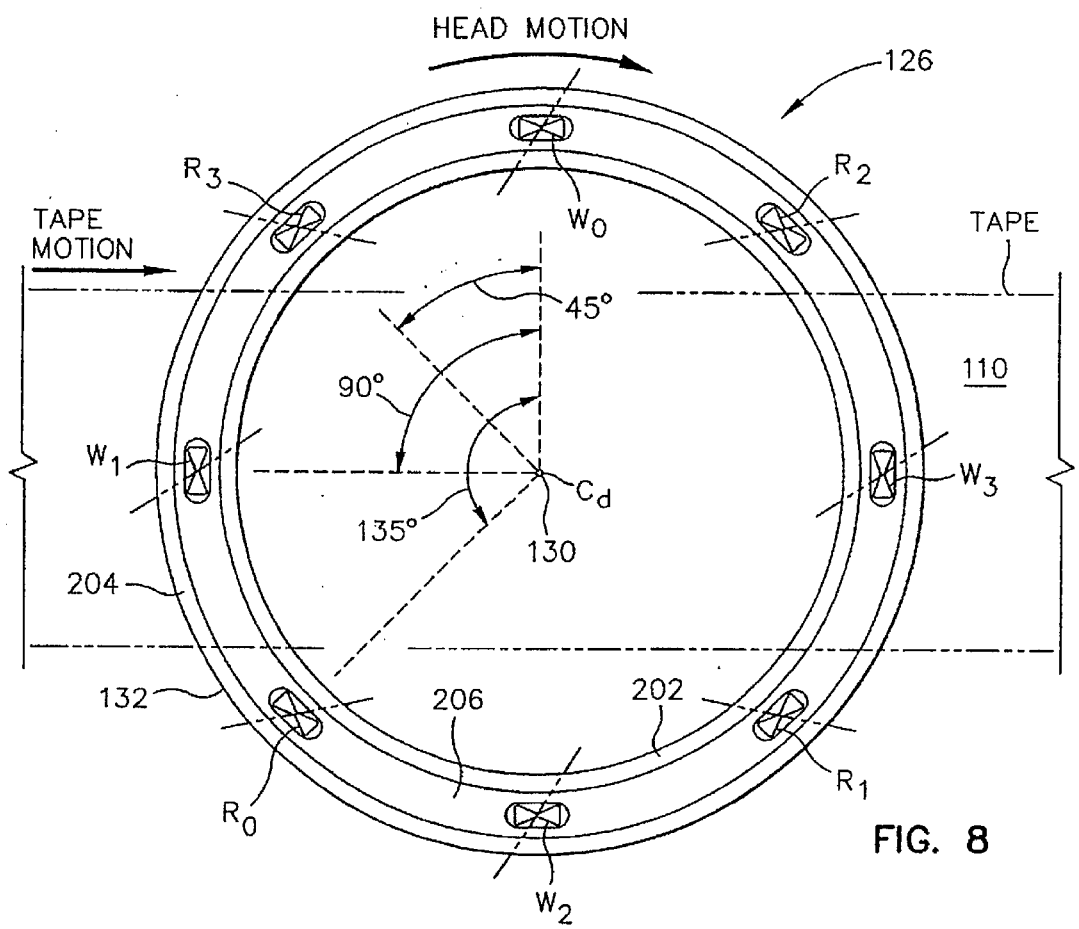
FIG. 8 is a schematic illustration showing positional relationships of the gaps of the read and write heads of the head assembly.
Figure 9:
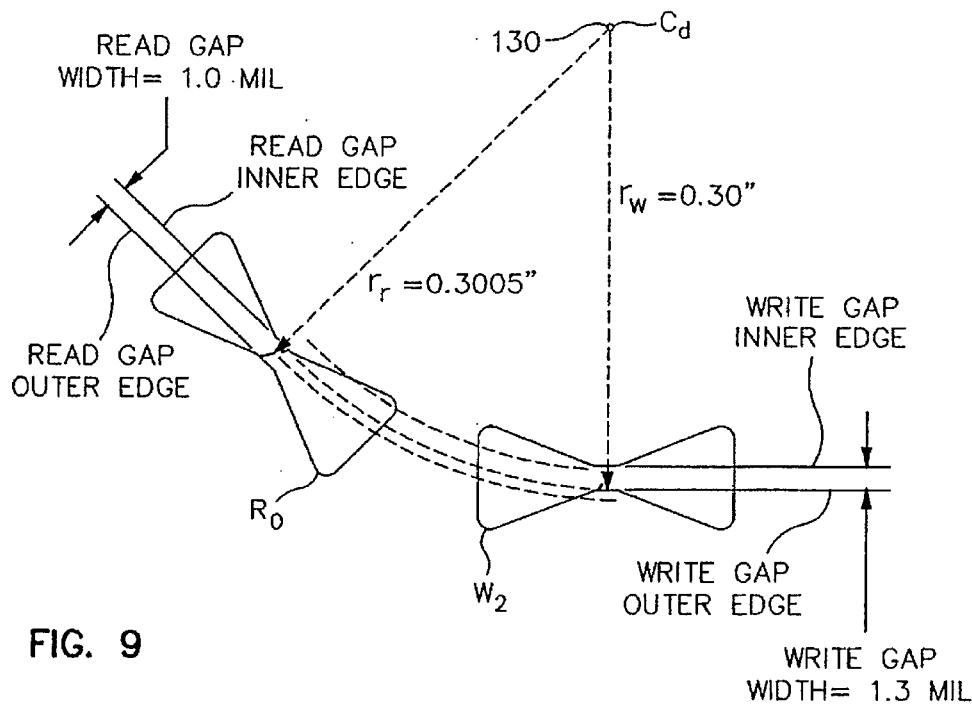
FIG. 9 is a plot showing the radial relationship of the read and write gaps of the head assembly of FIG. 8.

The preferred transducing architecture for the head assembly 126 is illustrated in FIGS. 8 and 9. FIG. 8 is a front view of the head assembly looking through the tape 110 at the reading location. As best seen in FIG. 8, there are eight magnetic heads mounted on the disk 132. Four magnetic heads are designated as write heads and are identified as $W_0$, $W_1$, $W_2$ and $W_3$. In addition, there are four read heads identified as $R_0$, $R_1$, $R_2$ and $R_3$. Identical subscripts identify write/read head pairs in which the track written by head $W_1$ is later read by head $R_1$. Further, the write heads are accurately spaced on the drum by 90° in the order in which they write tracks on the tape, which is $W_0$, $W_1$, $W_2$ and $W_3$. Similarly, the read heads are spaced from each other by 90°, but are spaced from adjacent write heads by 45°. Further, read head $R_1$ is displaced by 135° in the direction opposite the scanner rotation direction from write head $W_1$.

As the sequence of write (or read) heads is followed, the gap orientation alternately reverses. In this regard, the gap of the head $W_0$, indicated by the slanted gap, has a first azimuthal orientation which, in FIG. 8, is represented as the clockwise (CW) orientation. The next adjacent write head $W_1$, however, has a CCW azimuthal orientation. In fact, beginning with write head $W_0$, the azimuthal orientation of the write heads alternates as follows: CW, CCW, CW, CCW. As those skilled in the art will appreciate, the alternating azimuthal orientation of the write heads will result in alternating azimuthal orientation of written tracks. Inspection of FIG. 8 will show that the azimuthal orientation of the read head gaps sequences in the same manner as the write heads.

Refer now to FIG. 9 for an understanding of an important locational relationship between the read and write heads of FIG. 8. In this regard, with respect to a dynamic center ($C_d$) of rotation of the disk 132 about the axis 130, the gaps in the write heads are positioned so that their outer edges are located at a same radial distance ($r_w$). The centers of the read gaps are located at a same radial distance $r_r$ which is greater than $r_w$ by the width of a trimmed track. The width of a trimmed track is one over the revolutions per second of the head assembly 126 times the speed of the tape 110. The center of the read gap must be located at the center of the trimmed track, which is one-half its width, when the read gap $R_0$ reads the track trimmed by $W_0$. However, by the time the center of the read gap rotates to the center of the trimmed track, the tape has moved one-half the width of the trimmed track. Accordingly, $r_r$ is greater than $r_w$ by the width of the trimmed track as stated hereinabove.

Assume now that the relationship shown in FIG. 8 between the interface of the head assembly 126 and the tape 110 characterizes the head/tape interface in the miniature tape drive 100 of FIG. 1. In this example, quarter inch magnetic tape is used having a nominal width 0.247 inches. Assume the write head gap width is nominally 1300 microinches, the read head gap width is nominally 1000 microinches, the radial distance from the dynamic center of rotation of the head assembly to the outer edges of the write gaps is 0.3 inches and the trimmed track is 0.5 mils. The centers of the gaps of the read heads will then be on a circle with a radius $r_r = 0.3005$ inches. The sequence traced across the tape 110 from edge to edge when the head assembly 126 rotates in the direction indicated in FIG. 8 is: $W_0$, $R_3$, $W_1$, $R_0$, $W_2$, $R_1$, $W_3$, $R_2$.

As thus described, when the tape speed is matched to an appropriate rotational velocity of the drum, the write heads, when energized, will trace a sequence of contiguous recorded arcuate tracks with alternating azimuthal orientation. Preferably, for the eight-head configuration shown in FIG. 23 and the dimensions given above, the head assembly 126 rotates at 7500 rpm while the tape advances at 0.25 ips.

Figure 10:
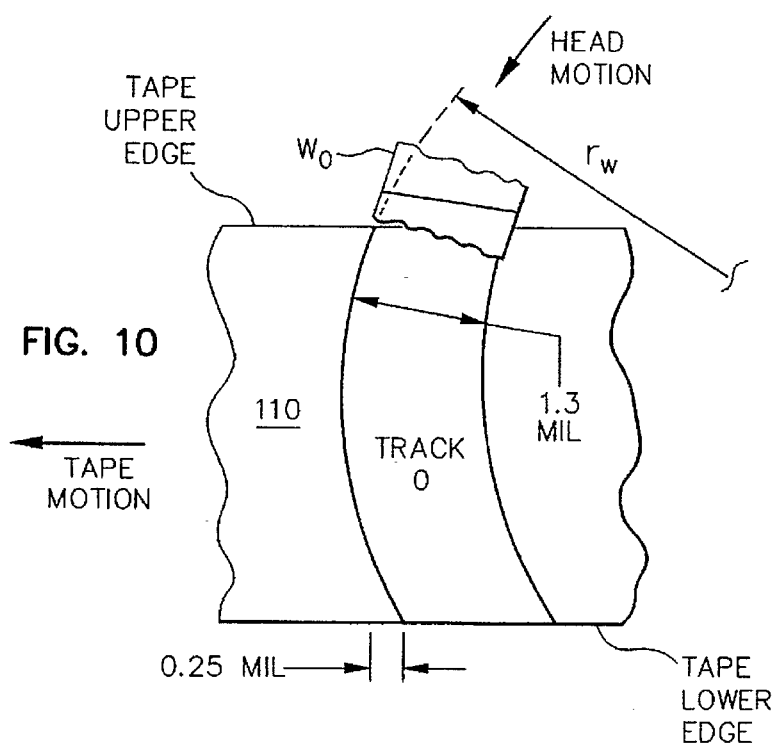
FIGS. 10, 11 and 12 are schematic diagrams illustrating how arcuate tracks are written on the tape.
Figure 11:
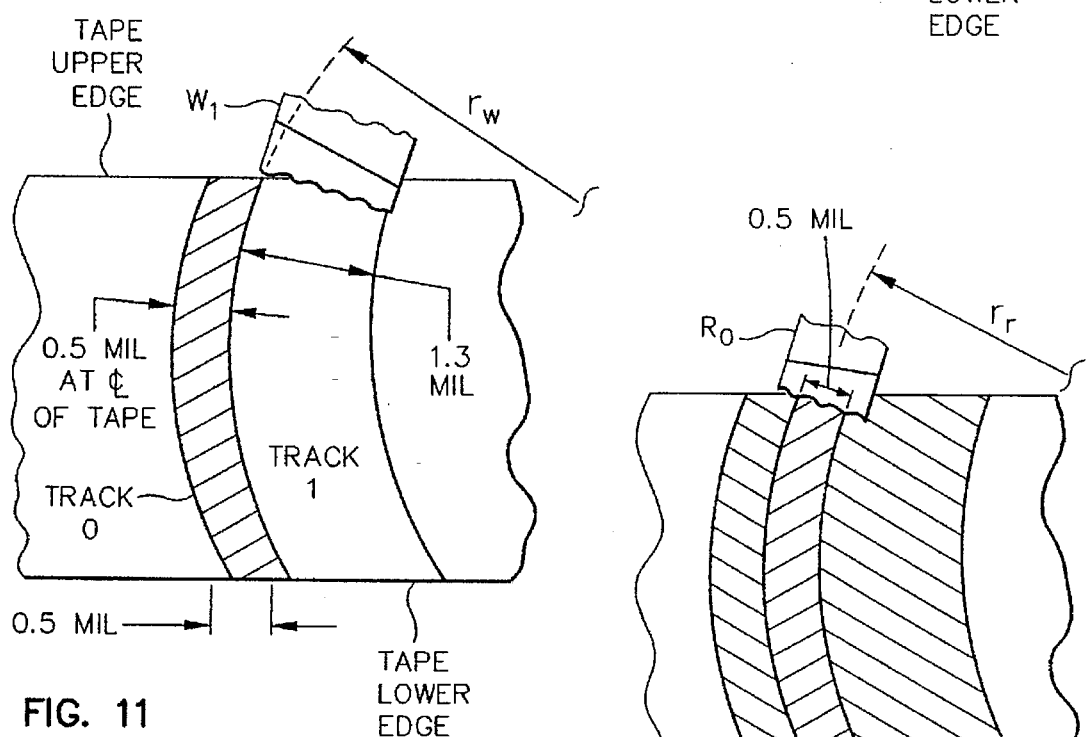
Figure 12:
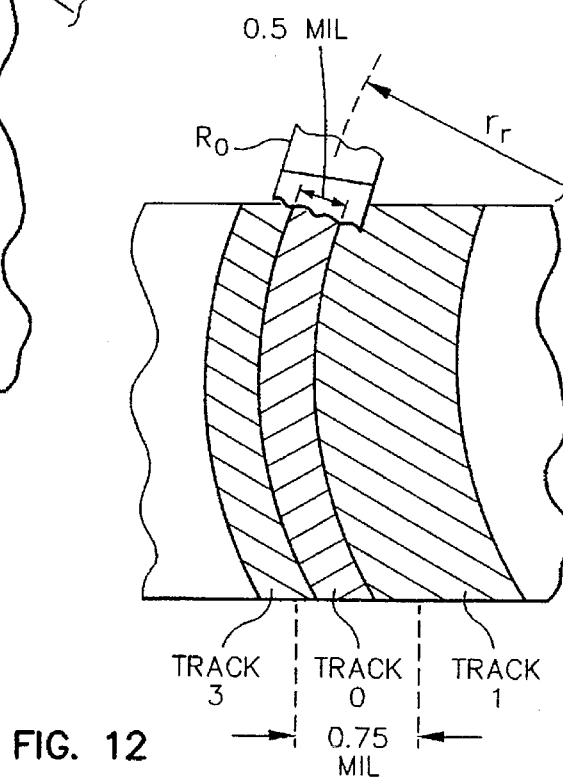

With these preconditions and with reference to FIGS. 10–12, the recording of information by the scanner 124 with the head architecture illustrated in FIGS. 8 and 9 can be understood. FIGS. 10–12 are a view of the tape 110, where the tracks are written and read. Accordingly, the direction of the tape 110 is from right to left and the direction of the head travel is counterclockwise. FIGS. 10–12 look from an opposite direction from that of FIGS. 8 and 9. The example only describes how data is recorded. Considerations of data validation by, for example, read-after-write are omitted only to ensure clarity of the explanation. The following sequence occurs during one rotation of the scanner:

1. As illustrated in FIG. 10, the outer edge of the gap on write head $W_0$ follows an are having the radius $r_w$. As the tape moves (right to left) and the head assembly rotates (CCW) write head $W_0$ writes track 0 consisting of a 1.3 mil-wide band of information having a CW azimuthal orientation.

2. When write transducer $W_0$ reaches the lower edge of the tape, the head assembly will have rotated by 45° and the tape will have moved 250 microinches, and read transducer $R_3$ with a CCW azimuth will engage the upper edge of the tape. The remainder of this step is ignored in this discussion.

3. As shown in FIG. 11, when the head assembly has rotated by another 45°, the tape will have moved 500 microinches, bringing the gap of write transducer $W_1$ into contact with the upper edge of the tape. At this point, write transducer $W_1$ begins to write track 1 having a CCW azimuthal orientation opposite that of track 0, and overlapping track 0 by 800 microinches. This leaves no gap between track 0 and track 1 and trims track 0 to a width of 500 microinches at the center of the tape.

4. In FIG. 12, 750 microinches of the tape have moved from right to left past the arc of radius $r_r$ and the head $R_0$ engages the upper edge of the tape. As FIG. 12 illustrates, the center of the gap of read head $R_0$ is at radial location $r_r$ with respect to the center $C_d$ of the head assembly. Recall that the read head gap is 1.0 mil wide; thus, the center of read head $R_0$ lies over the center of trimmed track 0. Accordingly, a central 500 microinches of the gap lies over track 0, while 250 microinches on each end of the gap overlaps adjacent tracks. Now, as read head $R_0$ traces the arc of track 0, it will respond only to the azimuthal orientation of the information in that track, ignoring the oppositely-oriented information in the adjacent tracks.

With this explanation of how tracks are recorded and read, a description will now be given of how servo information is recorded in those tracks. As inspection of FIGS. 13–16 will show, servo burst segments are recorded in servo burst regions adjacent to the tape upper edge and the tape lower edge by alternating write heads. These are denoted, respectively, as the first and second servo regions. In the figures, the servo bursts are written by write heads $W_0$ and $W_2$ (hereinafter "even" heads) but not by write heads $W_1$ and $W_3$ (hereinafter "odd" heads). The servo bursts are written by turning on the even write transducers earlier than the odd write transducers after passing the upper tape edge and by turning off the odd write transducers earlier than the even transducers as the lower tape edge is approached. FIGS. 13–16 illustrate an unrecorded guard band between each tape edge and an adjacent servo region; this band is optional and may be used or not as circumstances require.

Figure 13:
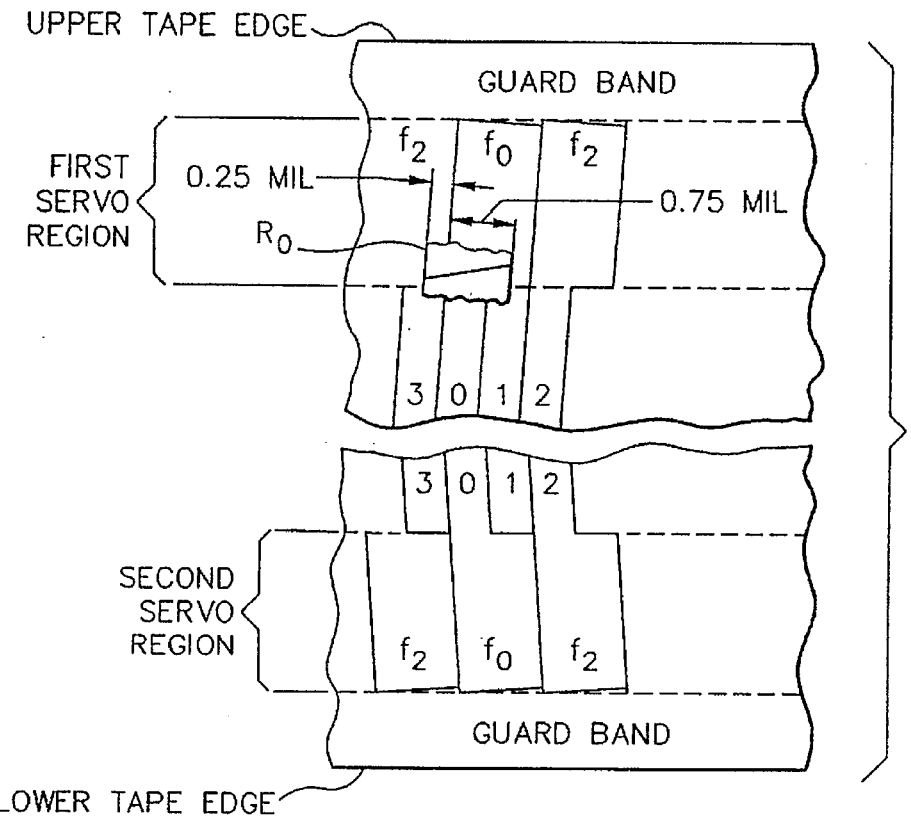
FIGS. 13–16 are schematic diagrams illustrating how servo information is written in the arcuate tracks.

As shown in FIG. 13, the servo burst regions are of substantially equal width. Thus, the servo information is written at the beginning and end of each even track and consists of a burst which is written 1.3 mils wide but only trimmed to 1.0 mil (nominal) by the following even write transducer. Preferably, the servo bursts comprise alternate frequencies which are at equal amplitudes in an unequalized channel and are generated from a system clock. Assuming a system clock of 40 MHz, a first servo frequency ($f_0$=1.6 MHz) and a second servo frequency ($f_2$=3.2 MHz) are obtained by dividing the system clock by 25 and 12.5, respectively.

These values are not intended to limit the implementation of the invention. They reflect engineering choices based upon the tape and head assembly speeds discussed above and emphasize early detection of the servo signals, before equalization of the readback signal. For the dimensions of the transducers, the servo frequencies can be abstracted as ratios of wavelength to read gap width which are constant at all combinations of tape and head assembly speeds and which reference either an unequalized or an equalized readback channel response.

Servo frequency $f_0$ is written by write head $W_0$, while servo frequency $f_2$ is written by write head $W_2$. Now assume that read head $R_0$ has just passed the upper tape edge on its counterclockwise scan of track 0 as shown in FIG. 13. If head $R_0$ is accurately positioned, substantially ¾ of its gap width (0.75 mil) will be on the servo track written by head $W_0$, while ¼ of its width (0.25 mil) will be on the servo burst in a track written by head $W_2$. Accordingly, with proper positioning, the read head $R_0$ while traversing the servo bursts at the beginning and end of each scan will generate a servo signal comprising the servo frequencies $f_0$ and $f_2$ in the ratio $3f_0:1f_2$. As disclosed below, these two frequencies are discriminating and their amplitude ratio is used to determine the magnitude of a servo error signal. Serving on readback of $R_2$ is based upon the ratio $3f_2:1f_0$.

Assuming an 8-head head assembly and a magnetic tape with the dimensional and speed values given above, an example will now be given of writing and reading a tape during one rotation of the scanner. This example corresponds to a read-after-write (RAW) procedure in which data is validated as it is being written by reading it immediately. In this operation, the head assembly is caged to the tape as described later. Although read head detection of servo bursts is described, this is for illustration only. Head assembly positioning and tape speed control in response to servo bursts would occur only when data is read from the tape during playback. In the example, the heads are referred to by their respective reference designations, that is: $W_0$–$W_3$ and $R_0$–$R_3$.

Figure 14:
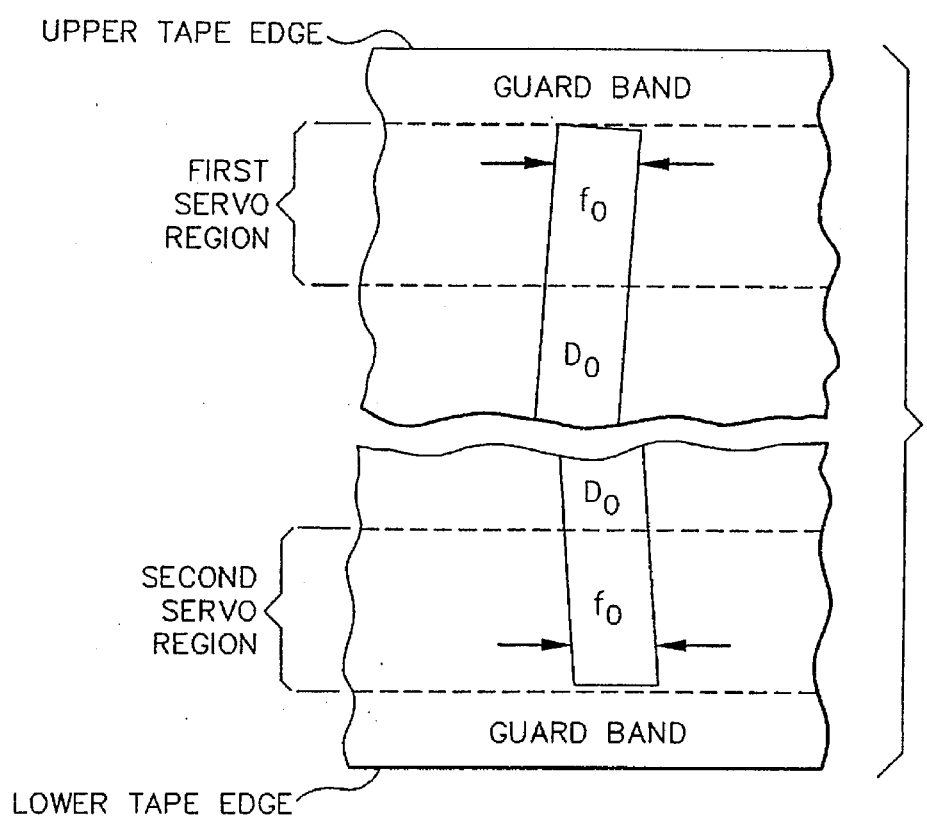

1. $W_0$, (CW azimuth) engages the tape upper edge and writes track 0 consisting of a 1.3 mil band of $f_0$ and, after delay through the first servo region, writes track 0 containing data $D_0$, after which $W_0$ writes a servo burst consisting of a 1.3 mil band of $f_0$ in the second servo region. When $W_0$ passes the lower edge of the tape, the tape will have moved 250 microinches. The result is shown in FIG. 14.

2. Now $R_3$ with a CCW azimuth engages the tape upper edge and traverses the tape in an arcuate scan (which is ignored at this time). When $R_3$ reaches the lower tape edge, the tape will have moved 500 microinches.

Figure 15:
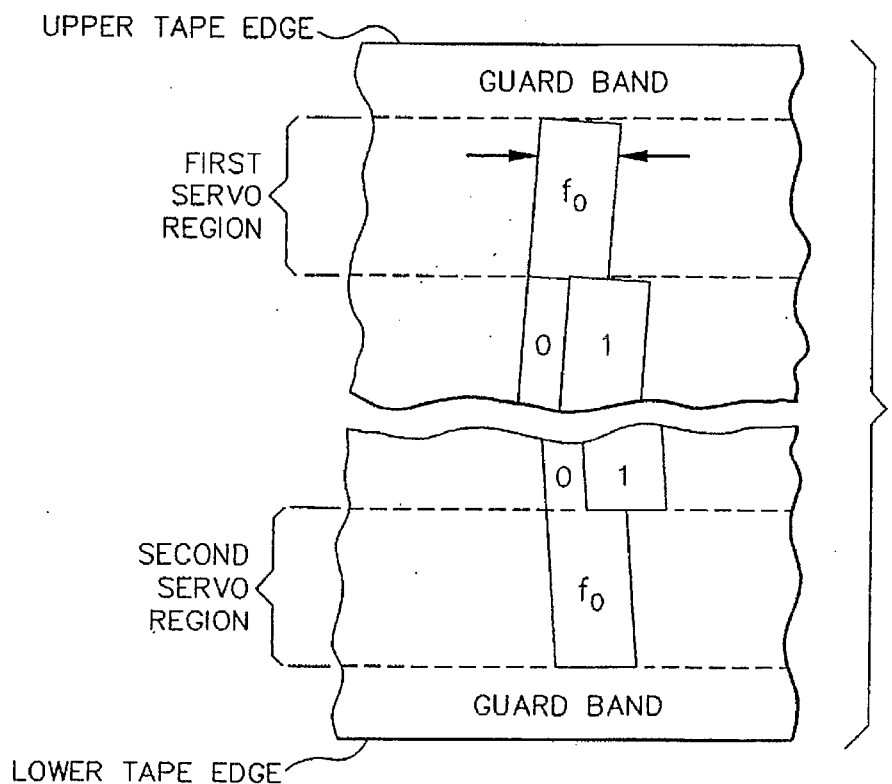

3. Now, $W_1$ with a CCW azimuth engages the upper edge of the tape. Writing with this head is delayed until $W_1$ has passed the first servo region, then $W_0$, which overlaps track 0 by 800 microinches, overwrites track 0 with track 1 consisting of data $D_1$ with no gap between track 0 and track 1. This leaves a trimmed track 0 with a width of 500 microinches. Track 1 has a track width of 1.3 mils and ends at the upper edge of the second servo region. At this point, data tracks 0 and 1 are bracketed between upper and lower servo bursts comprising 1.3 mils of servo frequency $f_0$. When $W_1$ reaches the lower edge of the tape, the tape will have moved 750 microinches. The result is shown in FIG. 15.

4. $R_0$ with a CW azimuth now engages the upper edge of the tape. $R_0$ then traverses the first servo region. If properly aligned, the read gap of $R_0$ will scan adjacent servo bursts as described above for FIG. 13. If properly aligned in the data region, $R_0$ is centered over trimmed track 0. Relatedly, the read gap is 1.0 mil wide, with its center 500 microinches positioned over the center of trimmed track 0 and 250 microinches at each edge overlapping adjacent tracks. Track 0 has a CW azimuth which energizes $R_0$, while the adjacent tracks have CCW azimuths to which $R_0$ is nonresponsive. When Ro traverses the second servo region, its readback signal will include $f_0$ and $f_2$ in the ratio $3f_0:1f_2$, if properly aligned. When $R_0$ reaches the lower edge of the tape, the tape will have moved 1000 microinches.

Figure 16:
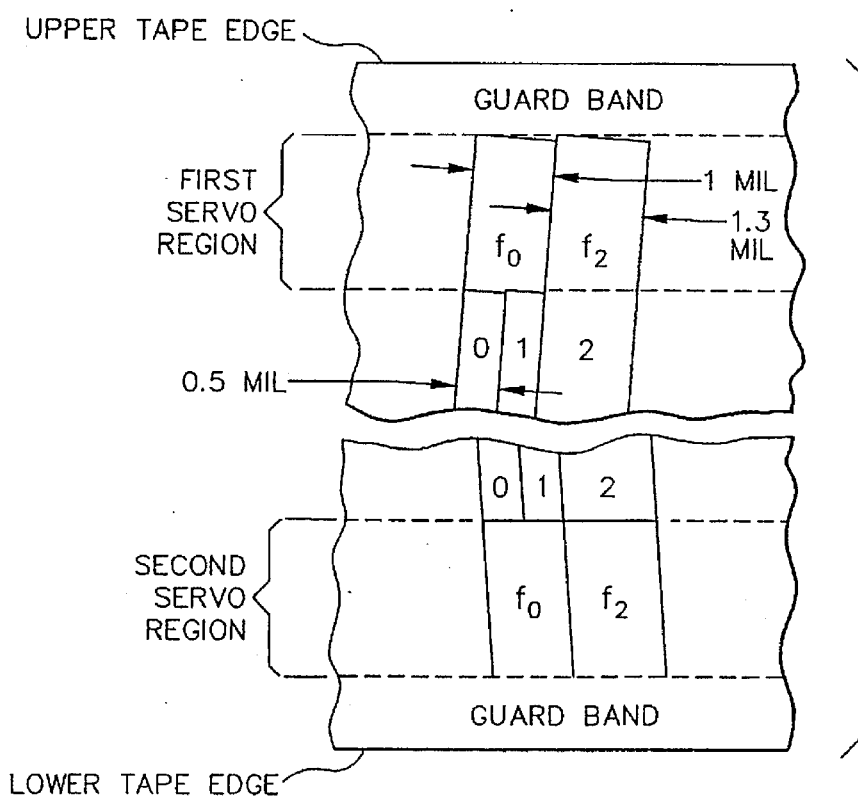

5. $W_2$ with a CW azimuth now begins tracing its arc from the upper edge of the tape to write track 2 consisting, initially, of a 1.3 mil-wide band of $f_2$ in the first servo region which overlaps the $f_0$ band by 300 microinches and then writes track 2 including data $D_2$. The outer edge of the gap in $W_2$ overlaps track 1 by 800 microinches and overwrites it, beginning in the data field, with track 2 data, ensuring no gap between track 1 and track 2. This leaves a trimmed track 1 of 500 microinches' width. $W_2$ appends a 1.3 mil-wide servo burst consisting of $f_2$ in the second servo region. At this time the tape has moved 1250 microinches. The result is shown in FIG. 16.

6. $R_1$ with a CW azimuth now engages the tape. Readback through $R_1$ is valid only between the servo regions. $R_1$ scans the data region of trimmed track 1 with its gap centered over the track. When $R_1$ reaches the lower edge of the tape, the tape has moved 1500 microinches.

7. $W_3$ with a CW azimuth now engages the upper edge of the tape and writes as in step 3 above. When $W_3$ reaches the lower edge of the tape, the tape has moved 1750 microinches.

8. Now $R_2$ with a CW azimuth engages the upper edge of the tape and reads track 2 as described in step 4 above. At this point the tape has moved 2000 microinches.

9. When $W_0$ with CW azimuth again engages the upper edge of the tape, the cycle comprising steps 1–8 described above is repeated. Note that on this next cycle, $R_3$ reads the track recorded by $W_3$ on the above-described cycle.

A tape speed servo loop operates during playback to ensure head/track alignment. This is a sampled servo which receives servo information when the even-numbered read heads, $R_0$ and $R_2$, read the servo bursts in the leading segments of recorded tracks. In the first servo region of the tape, there are only even tracks (0 and 2) of frequency $f_0$ and $f_2$, written by write heads $W_0$ and $W_2$, respectively. As described above, when read head $R_0$ is centered over track 0, the detected servo signal is in the ratio of $3f_0:1f_2$. Any other ratio is discriminated and controls the servo to change the tape speed so that the above ratio is obtained. The identical process occurs when read head $R_2$ is reading its tracks, in which case the ratio of the servo burst in the first servo region is $3f_2:1f_0$.

The tilt servo described hereinabove controls the location at which the head assembly axis of rotation 130 (see FIG. 2) intercepts a tape moving in its longitudinal direction by positioning the axis 130 transversely with respect to the longitudinal axis of the tape. Preferably, the tilt servo is activated during playback of previously-recorded tapes and compensates for misalignment of the tape due to different drive tolerances or tape dimensional changes resulting from temperature or humidity effects.

Accordingly, during recording, tilt servo bursts are recorded in the second servo region as described above. The bursts are identical in format and content to the servo bursts for the tape speed servo recorded on the first servo region. The tilt servo ensures that read heads scanning a tape remain on the same track for the entire scan. Detection of servo error and control of the tilt position in response is as described above for the tape speed servo. Since tilting of the scanner by the tilt servo causes the heads to move off the track location as positioned by the tape speed servo, while corrections are being made by the tilt servo, the tape speed servo may be placed into a "predict mode" and the tape speed is changed in a manner to compensate for correction movements of the tilt servo so as to realign the heads at the upper edge of the tape. After tilt servo operation at the lower edge of the tape, normal operation of the tape speed servo is resumed.

Figure 17:
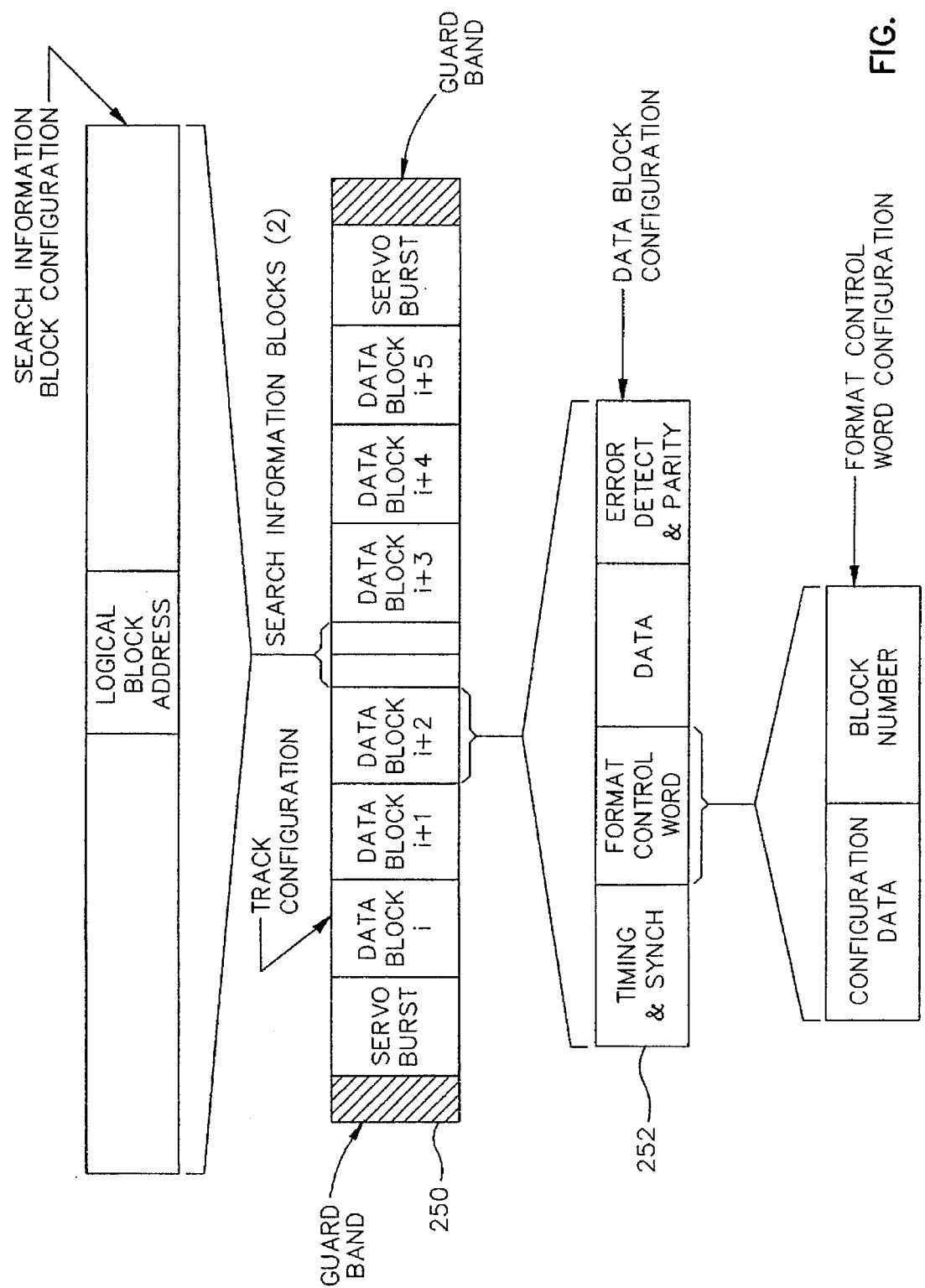
FIG. 17 is a schematic diagram illustrating the data format of an arcuate track.

The tilt servo also responds to data in each track as can be understood with reference to FIG. 17 in which track data configuration is illustrated. This configuration is oriented with respect to the left-hand edge of a data track 250 which corresponds to the upper edge of a tape while the right-hand edge of the data track 250 corresponds to the lower edge of the tape. From left to right, the configuration of the data track 250, which corresponds essentially to the configuration of every data track written, includes a guard band, a servo burst in the first servo region, a timing burst pad, three consecutively-numbered blocks of data, i through i+2, and two search information blocks which are centered substantially on the longitudinal centerline of the tape. Following the search information blocks are four more consecutively-numbered data blocks i+3 through i+5, a timing burst pad, a servo burst in the lower servo region, and a guard band. Each data block has the configuration illustrated in the data structure 252. In this regard, the data block is a multi-field structure including timing and synchronization (timing & sync) fields, a format control word, a plurality of fields for data, and error detection and parity (error detect & parity) fields. Each format control word of a data block includes configuration data and a block number identifying the data block. Data block numbering is consecutive through a sequence of tracks so that a first track contains data blocks 0–5, the second track contains datablocks 6–11, and so on. After alignment of the tilt servo as described above, the block number of data block i+5 at the end of a data scan of a track is compared to the block number at the beginning of the scan to confirm that the head is positioned over the same track for the entire scan. The difference between block numbers should be consistently 6 in the example shown in FIG. 17. If the difference indicates that there is at least one full track misalignment, the tilt servo is activated to move the head assembly the requisite distance up or down from the tape center line.

Each track further includes two consecutive search information blocks which are centered between the tape edges on the longitudinal center line of the tape. Each search information block has a configuration that includes a logical block address. The logical block address assumes the partitioning of data into frames in which each frame spans a group of consecutive tracks. There are a plurality of consecutively-numbered data blocks in the frame. The data blocks are also numbered consecutively by block number as described above and also logically by block address. The logical block address in the search information block of a track is the logical block address of the first block in the frame including the track, divided by 256.

Figure 18:
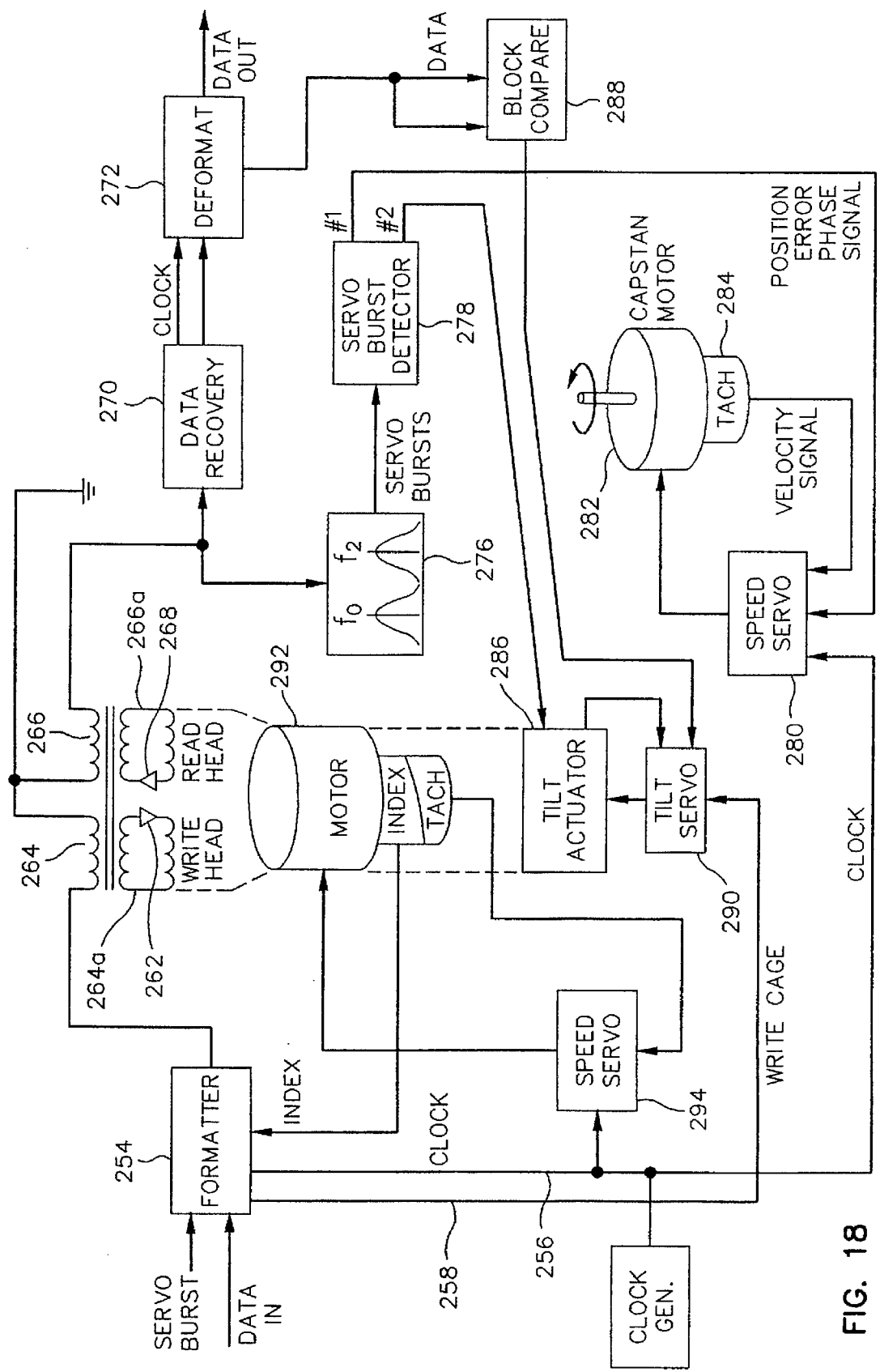
FIG. 18 is a block diagram illustrating channel and servo components of the tape drive.

FIG. 18 is a block diagram of the electronics necessary to operate the tape drive. An information formatter 254 receives user data, generates servo bursts, data format, and error correction information and creates a track format for each track illustrated in FIG. 17. Formatted track information is provided to a write driver 262 from the formatter 254 through a write stator winding 264. Track information is coupled from the write stator winding 264 to a write head 264a or to a write amplifier 262 and then to the write head 264a as described above. Data is read from written track by a read head 266a which is coupled through a read amplifier 268 to a read stator winding 266. The read stator winding 266 is connected to a servo burst detector 278 through band pass filters $f_0$, $f_2$ 276 and to a data recovery block 270 which regenerates a data clock and the non-servo portions of the recorded track data. This data stream is fed to a deformatter which recovers the original user data and corrects any errors created in the read/write process.

In the read only mode, the servo burst information is coupled from the read head 266a to the filter circuit 276 and provided to a servo burst detector 278. The servo burst detector 278 includes conventional servo circuitry and programming for generating at output #1 a position error signal for fine adjustment of capstan motor speed through speed servo 280 in order to ensure the read heads straddle the written tracks. The speed servo 280 sets the speed of a capstan motor 282 that imparts motion to a tape as described above. In the write mode, a tachometer 284 detects the speed of the capstan motor 282 and phase locks it to the CLOCK signal to drive the tape at the nominal speed which will result in the desired track pitch. During the write mode, the tachometer signal and CLOCK signal are input to the speed servo 280 to synchronize the speed of the tape with the rate at which data is written to it by the head assembly. During playback mode, the speed servo locks the velocity signal produced by the tachometer 284 to the position error phase signal produced by the servo burst detector 278 in response to the servo bursts in the first servo region of the tape. Thus, fine adjustment of alignment between the head assembly and the arcuate tracks on a tape is provided by adjustment of the tape speed through the capstan motor 282.

The servo detector 278 includes the appropriate logic to determine the ratios $f_0/f_2$ and $f_2/f_0$ in the second servo region when $R_0$ and $R_2$, respectively, are reading in playback mode. The detector uses each ratio to generate and provide a position error signal at output #2 to a tilt actuator 286 which pivots the head assembly as required for fine track alignment. Coarse adjustment of the location is provided by a magnitude and difference signal generated by a block compare circuit 288. The block compare circuit receives the DATA signal to detect block numbers, subtracts the block numbers, and, if the difference deviates from the prescribed amount produces a signal with a magnitude and difference sufficient to pivot the scanner as required to enable the read head to stay within the trace of a single and correct track. The magnitude and difference signal is fed to the tilt actuator 286. The tilt actuator comprises, preferably, the voice coil actuator shown and discussed above with respect to FIGS. 3 and 4.

During write mode, the tilt actuator bicell signal is provided to a tilt servo (centering) circuit 290 which receives the CAGE signal from a servo controller (not shown) denoting that the head assembly is to be caged (remains in a fixed position) whenever a track is written. In response to the CAGE signal, the tilt servo 290 operates the tilt actuator voice coil until the bicell signal reaches a preset reference value, indicating centering of the head assembly with respect to a tape.

A head motor 292 which rotates the scanner is operated at a rotational speed appropriate for a selected data format as determined by the CLOCK signal. The CLOCK signal is counted down by a speed servo 294 which locks the rotational speed and phase of the scanner motor 292 to the CLOCK signal. Thus, for a particular tape speed, the motor 292 is given a velocity which ensures that the data transfer rate and linear data density conform to predetermined values. At the same time the capstan motor 282 is driven at a speed to ensure that the tape moves a distance equal to four track widths per revolution of the head assembly for the head geometry shown in FIG. 8. The speed servo unit 294 phase locks the output signal of tachometer 296 to a signal derived from the CLOCK by appropriate frequency division. This ensures that tape speed and scanning speed will always be appropriately synchronized. The INDEX signal is output from the head assembly once per revolution to the formatter 254, which enables the formatter to synchronize data writing with head assembly rotation.

FIG. 18 illustrates write and read channel amplifiers 262 and 268 mounted on the rotary scanner (not shown), and coupled through respective rotary transformers to stationary circuitry. Microminiature integrated circuits which include these amplifiers and related circuitry may be conventionally mounted to the rotary scanner and powered by DC voltage provided through a slip ring joint (not shown). Alternatively, as taught in the incorporated application, the write and read heads 264a and 266a may be coupled through rotary transformers to channel amplifiers stationarily mounted in the tape drive.

Referring now to FIGS. 3 and 19–21, there is shown a shroud 300 which has a first leg 302, a second leg 304, and top and bottom cross pieces 306 and 308 joining the two legs. The shroud 300 may be a single piece with flanges 310 and 312 for adjustably fastening it to the plate 176 by slots 314 and 316 in the flanges and bolts 318 and 320. A lower portion 322 of the shroud leg 302 extends into a recess 324 in the plate 176. The shroud is supported on spacers 326 and 328. The spacers 326 and 328 are fixedly attached to the plate 176 by brazing, soldering, casting or machining. As is best seen in FIG. 3, the scanner 124 is fastened to the plate 176 over the recess 324. The recess 324 extends from the shroud 300 rearwardly to the back of the scanner, affording space underneath the scanner to pivot through the plane of the upper surface of the plate 176. The scanner is adjustably fastened to the plate 176 by the threaded bolts 177 so that the position of the head assembly 126 can be centered between the legs 302 and 304 at the recording location 116.

Figure 19:
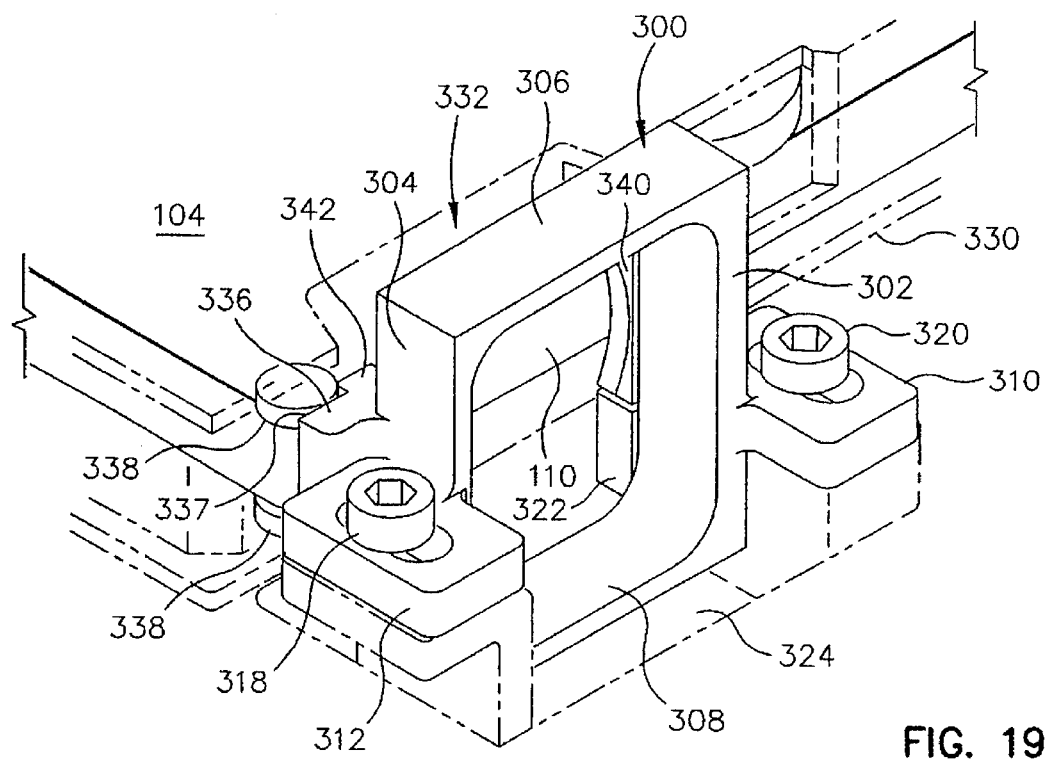
FIG. 19 is an isometric view of front guide members positioning a tape cartridge with the head assembly removed.
Figure 20:
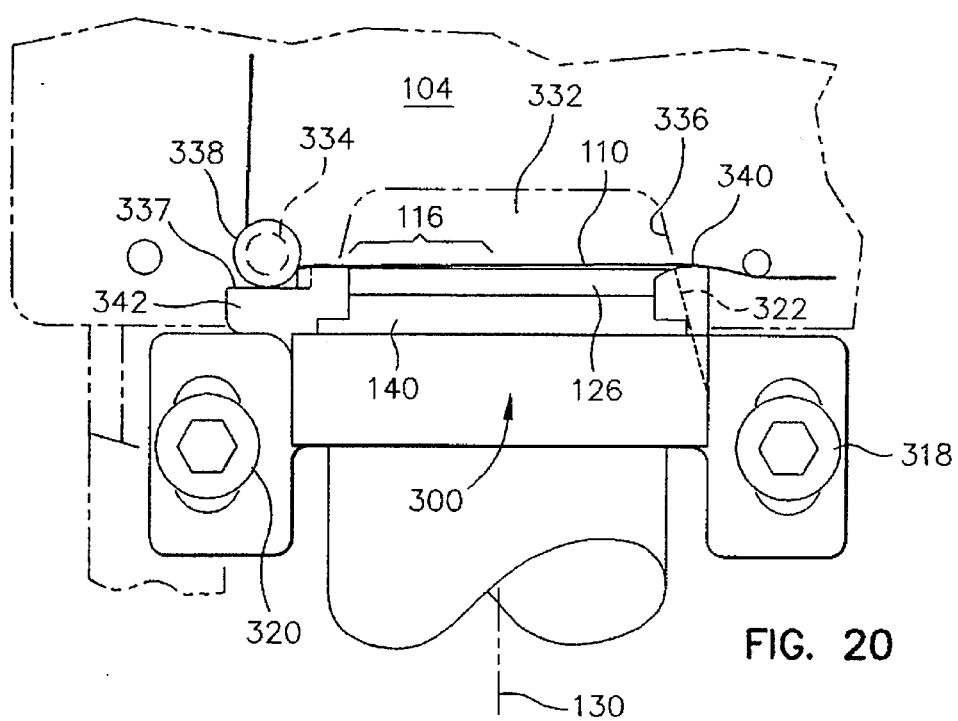
FIG. 20 is a top view of guide members positioning the tape for engagement with the head assembly.

The shroud 300 engages a tape cartridge as illustrated in FIGS. 19 and 20 for positioning the cartridges as explained hereinbelow. The lower metal plate 330 of the cartridge 104 is notched at 332 to expose the tape 110 for recording and playback. A guide pin 334 is fixed to the metal plate 330 at one side of the notch 332. Both sides of the notch 332 are defined by angled edges which transition from the front edge of the plate 330 to the back of the notch 332. Of these angled edges, the angled edge 336 is on the opposite side of the notch 332 from the guide pin 334. As shown in FIGS. 19 and 20, a forward edge 337 of the shroud leg 304 engages a lower flange 338 of the guide pin 334, while the lower portion 322 of the shroud leg 302 engages the angled edge 336 on the cartridge lower plate 330. As best seen in FIG. 20, the lower portion 322 of the shroud leg 302 has a surface with an angle whose value is complementary to the angle of the angled recess edge 336. The cartridge 104 is transported into the tape drive until the forward edge 337 engages the lower flange 338 and the angled edge 336 engages the complementarily angled surface on the lower portion 322 of the shroud leg 302. The shroud 300, therefore, indexes the cartridge 104 with respect to the scanner 124 so that the plane of the tape 110 is precisely positioned at the recording location 116 with respect to the head assembly 126.

As shown in FIGS. 3 and 19–21, the shroud leg 302 has at its forward end a curved erasing tape guide 340 and the shroud leg 304 has at its forward end a sloping tape guide 342. The purpose and unique structure of the curved erasing tape guide 340 and the sloping tape guide 342 will be described in detail hereinafter.

Figure 21:
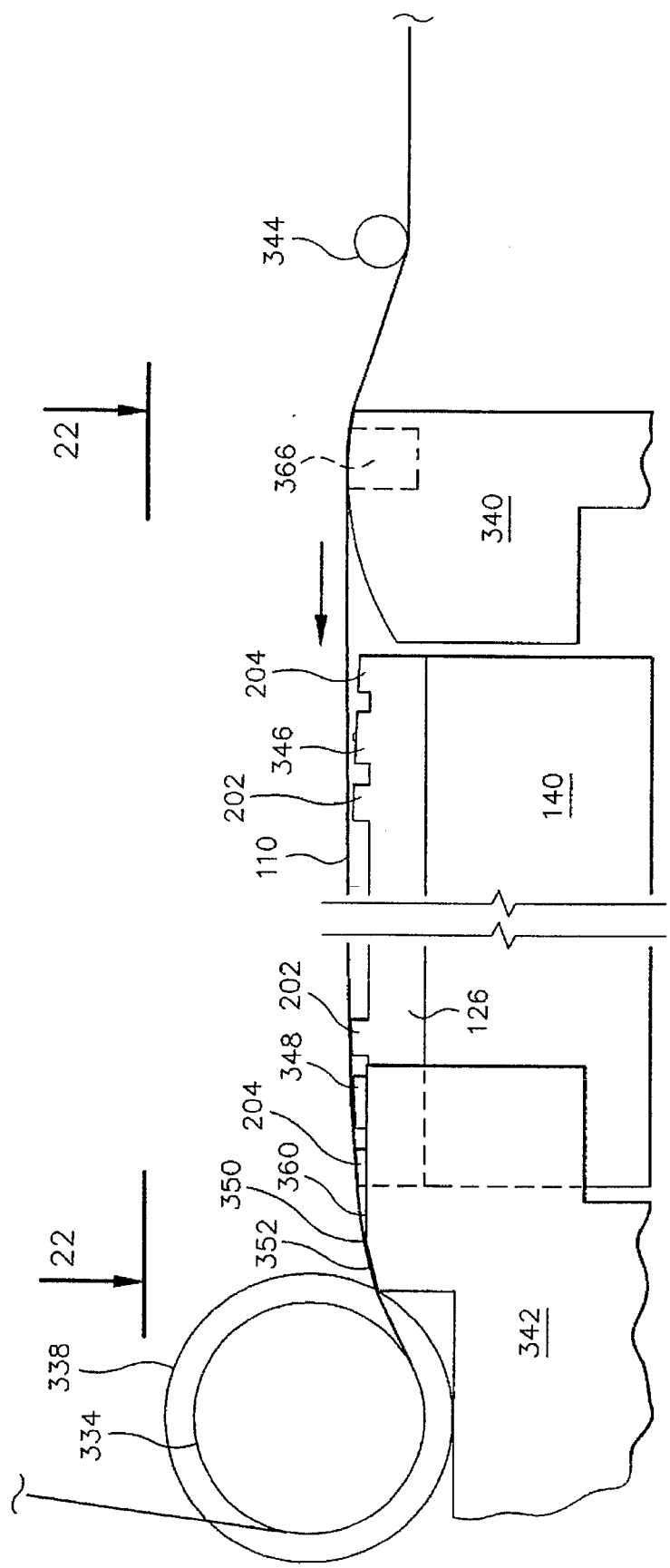
FIG. 21 is an enlarged side view/cross section illustration of guides guiding a tape across the head assembly.

FIG. 21 schematically illustrates the preferred path that the magnetic tape is forced to take by various components of the shroud 300 and the head assembly 126. The preferred direction of movement of the tape is from right to left, however, it can be in an opposite direction if desired. When the cartridge 104 is mounted, the tape 110 is essentially pushed against the front surface of the head assembly 126. The components in the cartridge 104 which control the path of the tape are the roller guides 334 and 344 and the guides on the shroud which control the path of the tape 110 are the erasing tape guide 340 and the sloping tape guide 342 which are located diametrically opposite one another adjacent a periphery of the head assembly. In the preferred embodiment the head assembly has tape guides which are the inner and outer annular ridges 202 and 204 located on the front face of the head assembly 126. As stated hereinabove, the front surfaces of these annular ridges are coplanar and slope rearwardly, with respect to the scanner, toward the periphery of the head assembly as seen also in FIG. 6. Further, as described hereinabove, the head surface of the magnetic head located in the annular recess 206 between the inner and outer annular ridges 202 and 204 may project slightly forward of the plane of the top annular surfaces of the annular ridges 202 and 204, such as 0.5 to 1 mil.

As shown in FIG. 21, the magnetic tape wraps around the cartridge guide 344 thence forwardly to the erasing tape guide 340. The erasing tape guide is positioned slightly forward of the head surface of a magnetic head 346 so that the tape is positioned in a spaced relationship with respect to heads rotating adjacent thereto. Next, the tape wraps on the inboard annular ridge 202, thence wrapping to the head surface of the magnetic head 348, thence slightly rearwardly to wrap to the outboard annular ridge 204, thence rearwardly to wrap to the sloping tape guide 342 along a line 350, thence engaging a sloping surface portion 352 of the sloping tape guide, thence slightly rearwardly to wrap to the cartridge guide 334 to return to reels (not shown) within the cartridge. With this arrangement longitudinally moving magnetic tape 110 makes a low pressure transducing engagement with rotating magnetic heads as they arc across the width of the magnetic tape.

The sloping tape guide 342 is important for improving the usable recorded width of the magnetic tape 110 for the scanner. The sloping tape guide 342 is adjacent the periphery of the head assembly 126 where the magnetic heads perform their read and write functions in engagement with the tape 110. It has been discovered that with a normal guide, like the erasing tape guide 340, there is a reduction in the tension/unit width near the top and bottom edges of the tape. This change in tensile-stress field at the tape edges forces a reduction in the tape head contact causing a recording and playback signal loss due to poor contact between the head and tape due, in turn, to low tape tension at the edges of the tape. The result is an effective "deadband" region at the tape edges.

Figure 22:
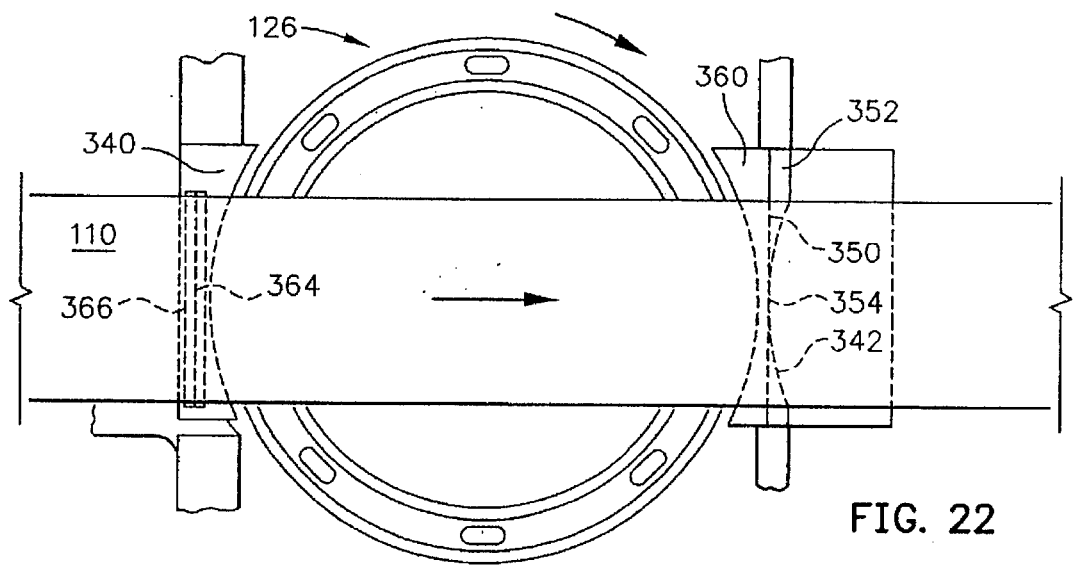
FIG. 22 is a front view taken along plane 22—22 of FIG. 21 with top and bottom portions of the shroud broken away.
Figure 23:
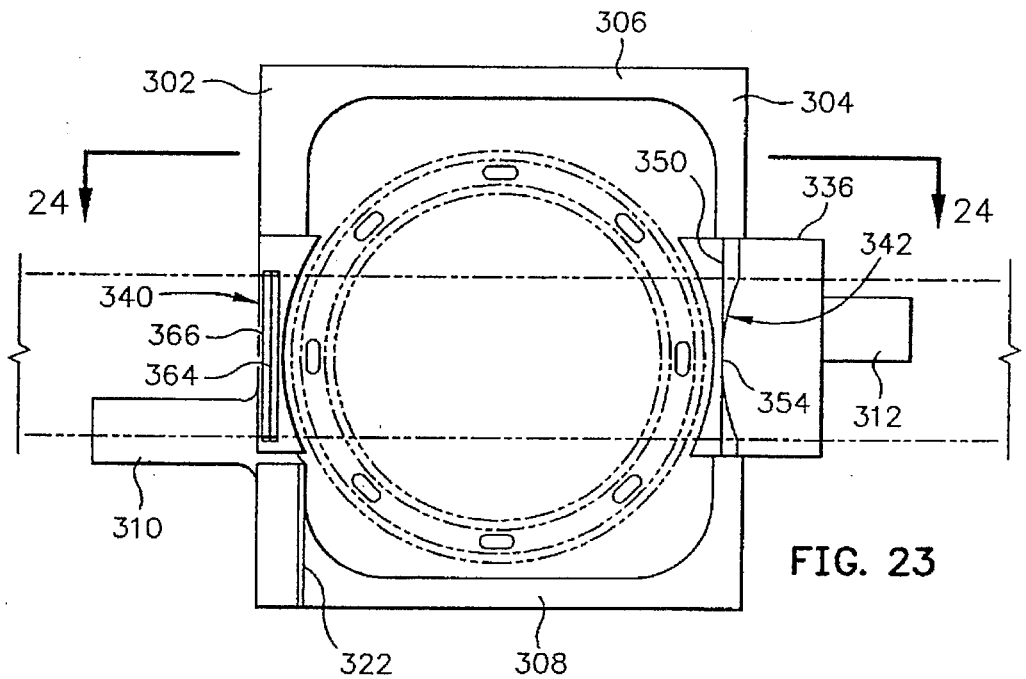
FIG. 23 is a front view of the complete shroud with oppositely located tape guides.
Figure 26:
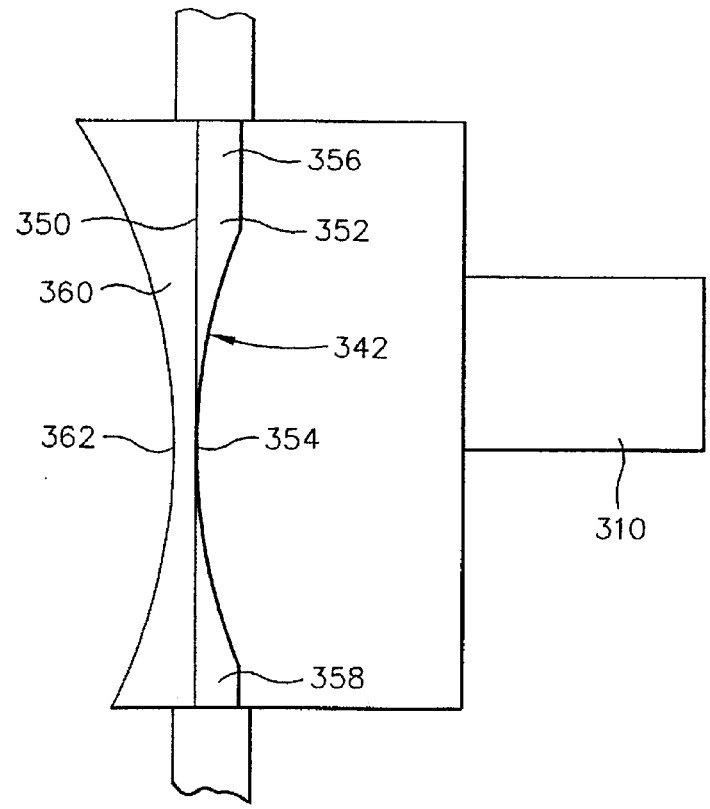
FIG. 26 is a front view of the sloping tape guide taken along plane 26—26 of FIG. 25.

The aforementioned problem has been overcome by increasing the tape path length of the tape edges adjacent the arcuate scanning by the magnetic heads. As shown in FIGS. 22, 23 and 26, the sloping surface portion 352 of the sloping tape guide 342 is curved laterally at 354 so that top and bottom portions 356 and 358 (see FIG. 26) of the sloping surface portion provide longer tape length than the center of curve 354. Since these portions are intended to contact the tape edges that are parallel to the longitudinal axis of the tape, they are also referred to herein as "longitudinal edge portions". The curve 354 is substantially an arc of a circle which is a mirror image of the circular periphery of the head assembly 126. For this reason, the curve 354 is referred to as a "reverse curve." The reverse curve 354 of the sloping tape guide 342 serves to increase the strand length of the tape 110 near its edges compared to its center and enables tension to be distributed evenly across the tape. Assuming a head assembly 126 with a radius of 0.330 inches, suitable dimensions for the sloping guide are as follows: a radius of 0.330 inches for the curve 354, 0 for the smallest width of the sloping surface portion at its center, and 5° for the rearward slope of the sloping surface portion.

The height of the reverse curve on the sloping surface portion between end points should be slightly larger than the width of the tape which is approximately 0.250 inches. Optionally, the curve may extend beyond these points, however, in the embodiment shown the curve is terminated at top and bottom edges of the tape and straight sloping surface portions extend therebeyond. As discussed hereinabove, the tape makes a wrap along the line 350 which is tangent the center of the curve 354. The sloping tape guide may have a flat surface portion 360 which extends vertically at least the width of the tape and has a curve 362 which complements and is concentric with the circular periphery of the head assembly 126. The flat surface portion 360 joins the sloping surface portion 352 at the line 350. The distance between the curve 362 of the flat surface portion and the periphery of the head assembly is kept at a minimum, such as 0.010 inches. The distance between the sloping tape guide 342 and the circular periphery of the head assembly 126 should be minimized to avoid stress decay per unit tape width-length ratio. It should be understood that the reverse curve 354 of the sloping tape guide 342 can be changed as desired to compensate for any factors which effect the effective edge tension of the tape. Further, the sloping tape guide 342 will work equally as well on a back side of the tape in other embodiments of rotary arcuate scanners.

Figure 24:
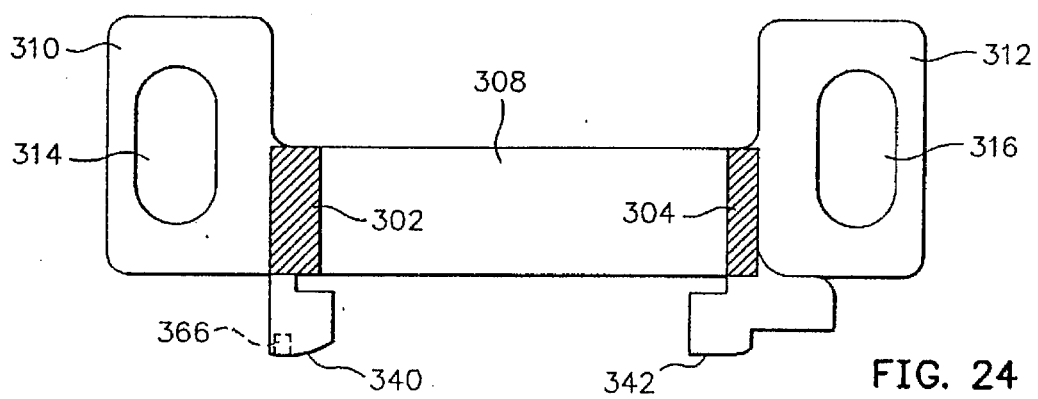
FIG. 24 is a view taken along plane 24—24 of FIG. 23 with the head assembly removed.
Figure 25:
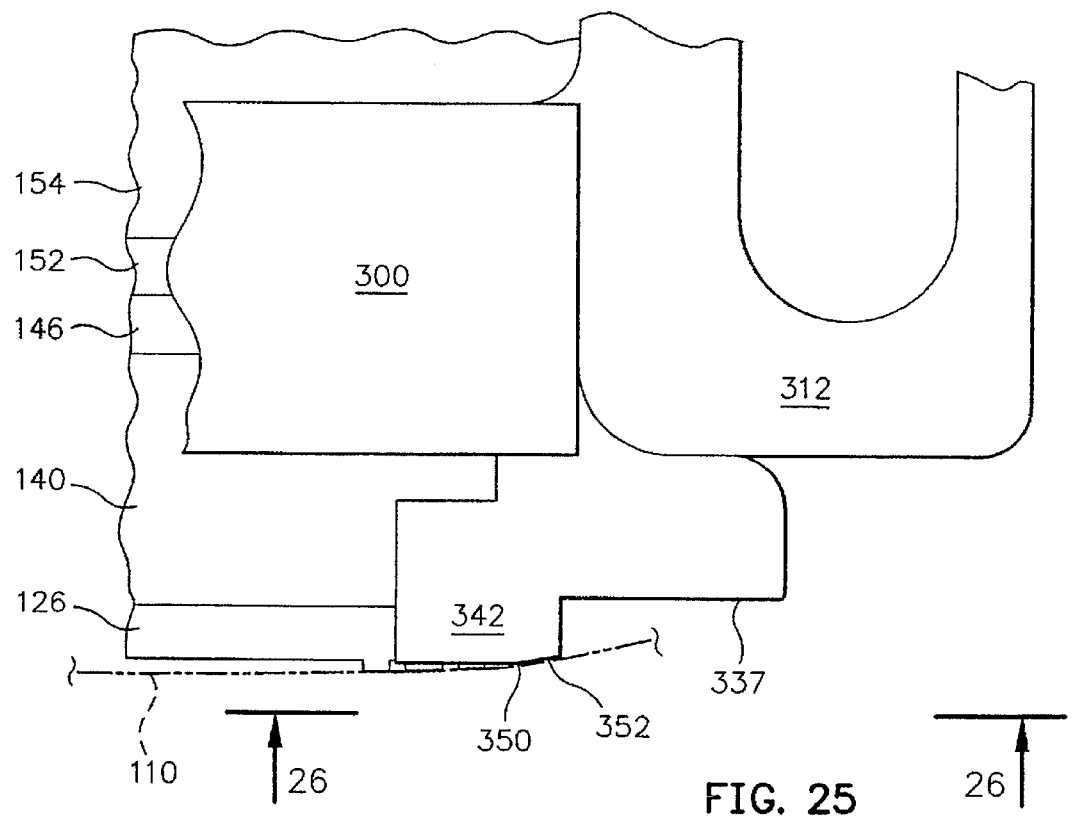
FIG. 25 is a side view of a sloping tape guide adjacent one edge of the head assembly for guiding the tape.

As shown in FIGS. 23 and 24, the erase head tape guide 340 and the sloping tape guide 342 are integral with the shroud 300. Optionally, the guides could be separate pieces which are mounted to the shroud at the locations shown in the figures. FIG. 23 is a front view of the shroud 300 and guides 340 and 342 with respect to the scanner looking through the magnetic tape which is moved thereacross from left to right. As can be seen from FIG. 23, the reverse curve 354 of the sloping tape guide 342 extends at least the width of the tape so as to provide the additional path lengths at the top and bottom edge portions of the tape to normalize tensile forces thereacross. FIG. 23 also shows the flanges 310 and 312 which receive the bolts 318 and 320 in FIG. 2. Also shown in FIG. 23 are the guides 322 and 336 on the shroud 300 for engaging and positioning the cartridge as illustrated in FIG. 20.

Figure 27:
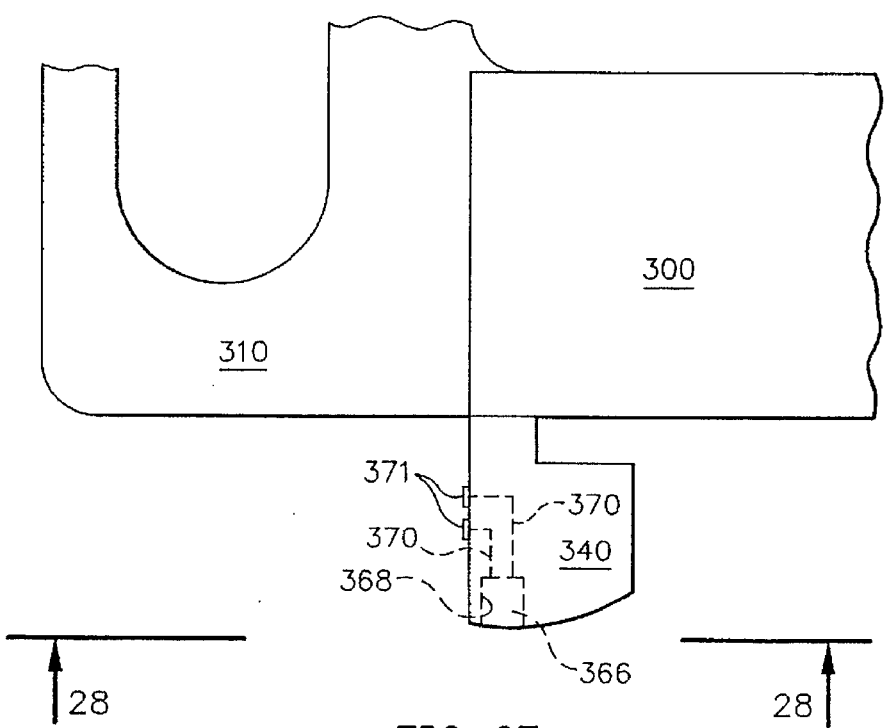
FIG. 27 is a side view of an erase head tape guide adjacent an opposite edge of the head assembly.
Figure 28:
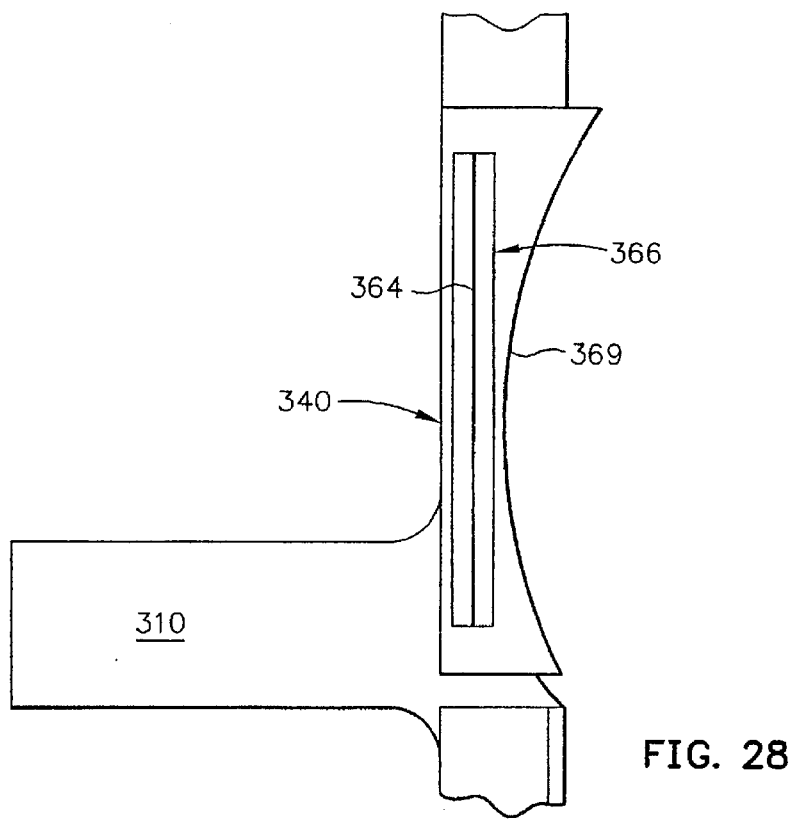
FIG. 28 is a front view of the erase head tape guide taken along line 28—28 of FIG. 27.

The erase head tape guide 340 is illustrated in FIGS. 27 and 28. The wrap between this guide and the magnetic tape occurs substantially at a line 364. It is substantially at this line that the gap of an erase head 366 is provided for erasing the magnetic tape before the tape moves across the magnetic heads. As shown in FIG. 28, the gap 364 of the erase head 366 extends substantially the entire width of the magnetic tape so as to insure complete erasure thereof. In the preferred embodiment, the erase head is a thin film inductive head which employs coils which are inductively coupled to a pair of pole pieces which will be described in more detail hereinafter. The erase head tape guide 340 is provided with an elongated recess 368 into which the erase head is mounted. The erase head, which is preferably batch fabricated and comprises thin film layers, is mount in the elongated recess so that the gap of the erase head is substantially flush with the foremost curved surface of the guide. Optionally, the head surface of the erase head could project slightly forward of the foremost curved surface of the guide so as to insure good transducing engagement with the magnetic tape as it wraps thereacross. The erasing tape guide 340 has a transverse arc 369 adjacent to and complimentary to the periphery of the head assembly 126 so that the erase head can be positioned close to the head assembly. As shown in FIG. 27, vias 370 may be provided to terminals 371 for energizing the erase head. Accordingly, the erasing tape guide 340 serves a double function as a tape guide as well as an erase head for the present rotary arcuate scanner. The radius of the curve of the erase head tape guide may be approximately 0.316".

Figure 29A:
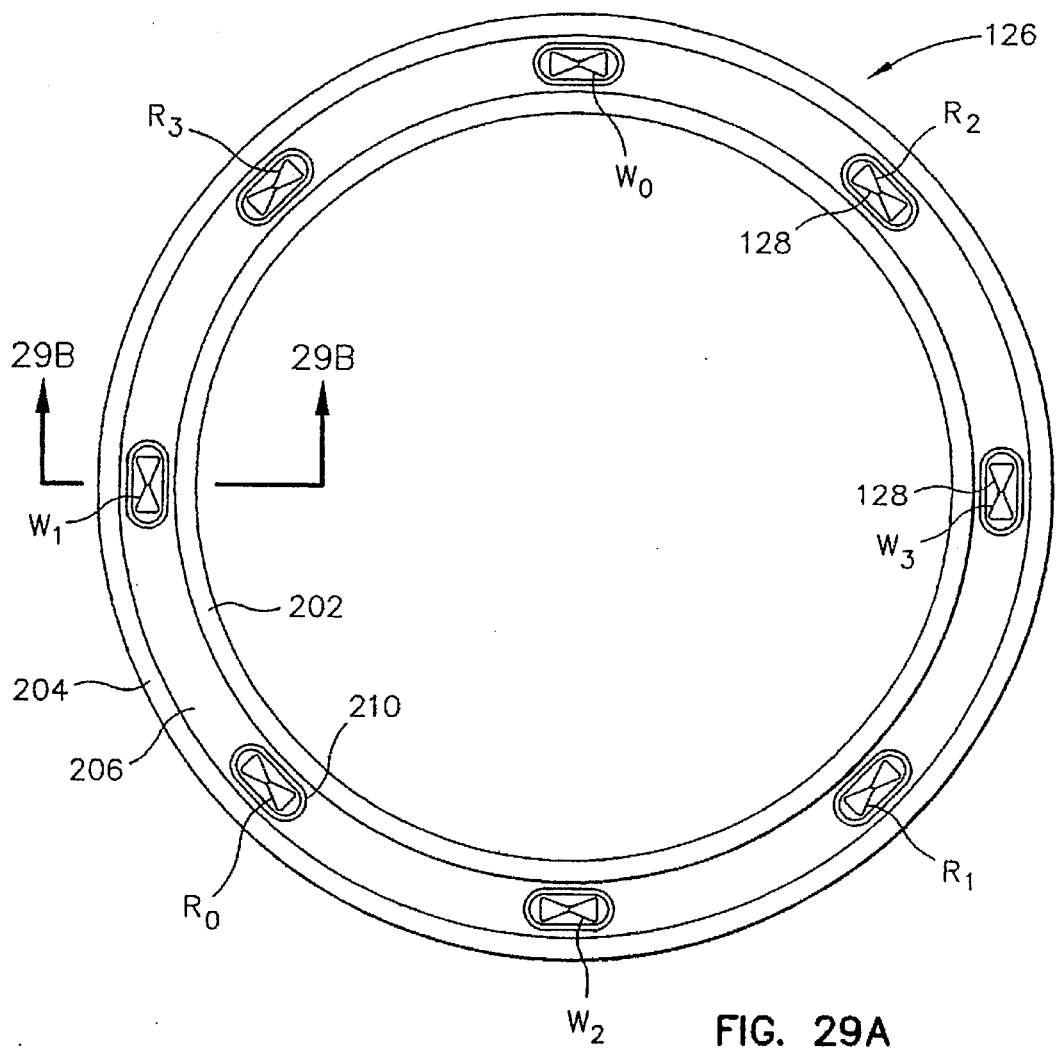
FIG. 29A is a front view of a first embodiment of the head assembly.
Figure 29B:
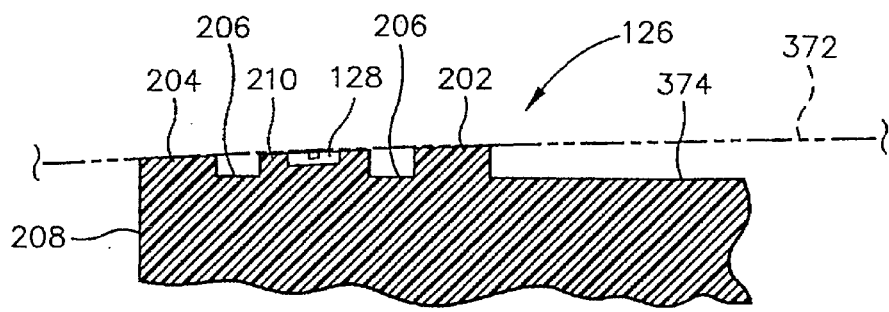
FIG. 29B is a view taken along 29B—29B of FIG. 29A.

A preferred head 126 assembly is illustrated in FIGS. 29A and 29B. This is the same head assembly that was discussed hereinabove in reference to FIGS. 6 and 7. This head assembly has inner and outer annular ridges 202 and 204 with an annular recess 206 therebetween. A plurality of magnetic heads are constructed on islands 210 within the recess. As can be seen in FIG. 29B, the forward annular surfaces of the inner and outer annular ridges 202 and 204 and the island 210 are coplanar along a plane 372 and slope rearwardly toward the outer circular periphery 208 of the head assembly 126. The head surface of the magnetic head 128 is slightly forward of the plane 372, such as 0.6–0.7 mils, which will be shown later. This may be accomplished by constructing the magnetic heads so that the head surfaces project the desired distance forwardly of the plane or by constructing the islands with forward surfaces slightly forward of the plane.

In a preferred embodiment there are four read heads and four write heads which alternate with respect to one another as illustrated in FIG. 29A. Further, the gaps of these magnetic heads alternate in azimuth with respect to a radius through a center of each gap according to a scheme which was shown in FIG. 8. The alignment of these gaps are critical to proper operation of the head assembly. The inner edges of each of the write gaps should be aligned on a first circle and the centers of the read gaps should be located on a concentric second circle which is outboard of the first circle. The present invention employs thin film technology for constructing the magnetic heads so as to precisely align the gaps of the read and write heads and allow mass production of the head assemblies which will be described in more detail hereinafter.

Suitable dimensions for the head assembly illustrated in FIGS. 29A and 29B are an outer radius of the disk and the outer annular ridge 204 of 0.330 inches, a radius of 0.318 inches to the inner periphery of the outer annular ridge 204, a radius of 0.293 inches to the outer periphery of the inner annular ridge 202 and a radius of 0.2815 inches to the inner periphery of the inner annular ridge 202.

In a preferred embodiment the head assembly includes the disk being a substrate and the magnetic heads being constructed thereon by thin film technology. The disk can be made of any suitable etchable material such as silicon or titanium carbide. Multiple head assemblies can be constructed on a wafer which comprises this type of material. With appropriate masking by photolithography, each head assembly can be etched with a solvent or reactive ion etched to form the inboard and outboard annular ridges 202 and 204 as well as the islands 210 therebetween. The etching may also provide a large central circular recess 374.

Figure 30A:
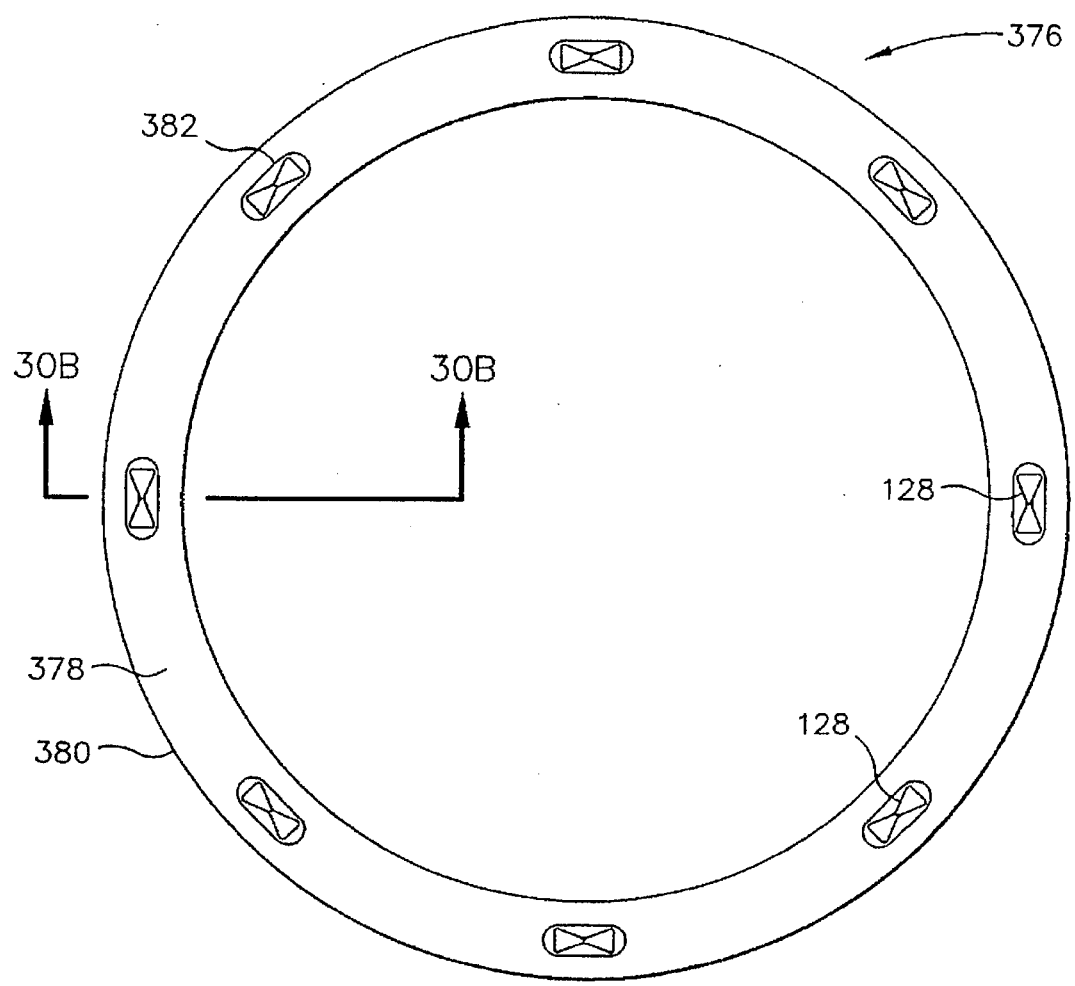
FIG. 30A is a front view of a second embodiment of the head assembly.
Figure 30B:
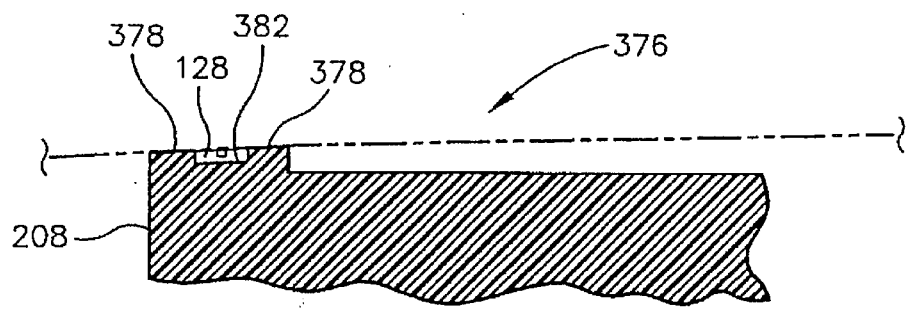
FIG. 30B is a view taken along plane 30B—30B of FIG. 30A.

Another embodiment of the head assembly 376 is illustrated in FIGS. 30A and 30B. In this embodiment the disk of the head assembly is provided with an annular ridge 378 which is adjacent its circular periphery 208. The annular ridge may be provided with a forward annular surface which has a rearward slope toward the circular periphery of the disk as discussed hereinabove. Each magnetic head may then be constructed in a recess 382 within the annular ridge 378 at appropriate angular spacing therearound. Top thin film layers of the head may be provided with a sufficient thickness so that the annular ridge 378 can be lapped after construction of the magnetic heads to provide the rearward slope of the annular ridge 378 toward the circular periphery 208 of the disk. During this lapping process, a portion of top layers of the magnetic head may be ground away, however, desired thickness of these layers will remain if a sacrificial thickness is provided during construction. This same technique can be used in all embodiments of the invention.

Figure 31A:
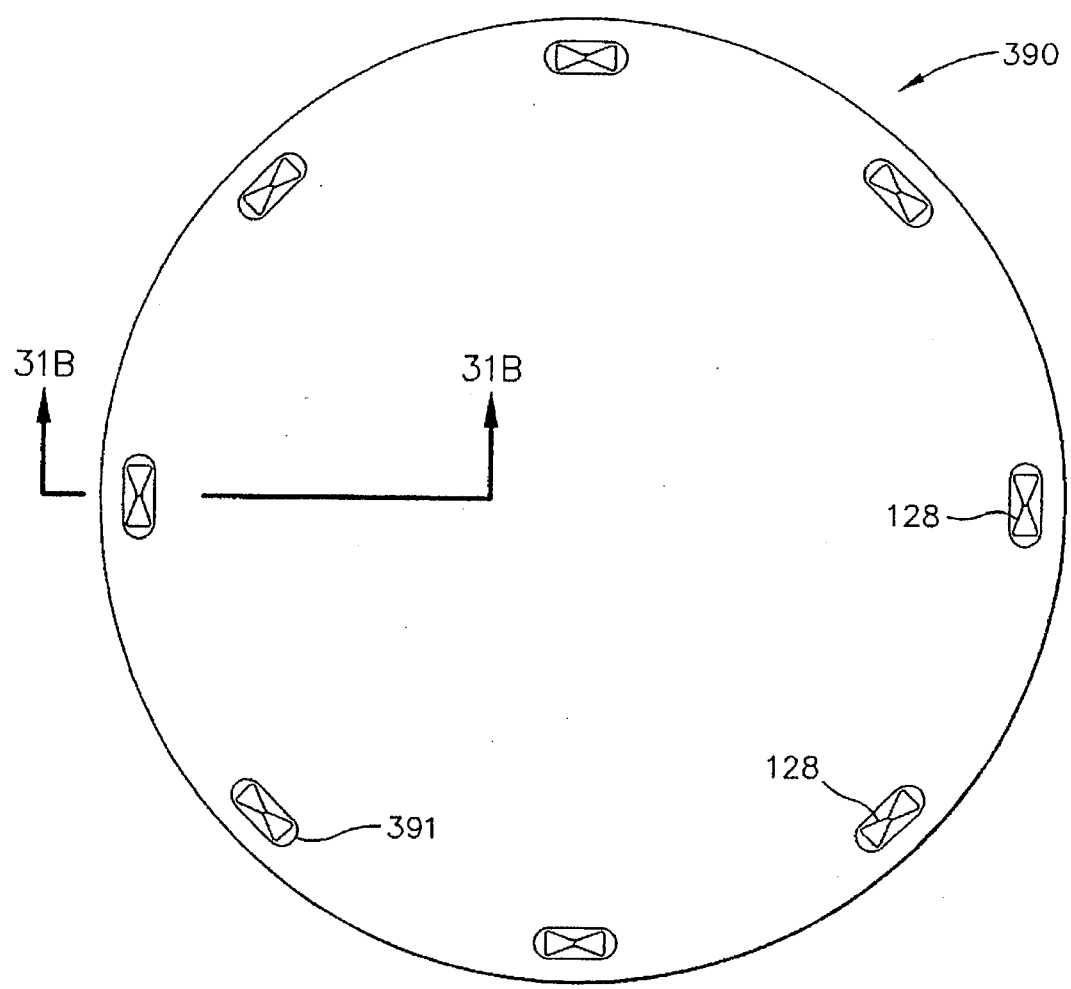
FIG. 31A is a front view of a third embodiment of the head assembly.
Figure 31B:
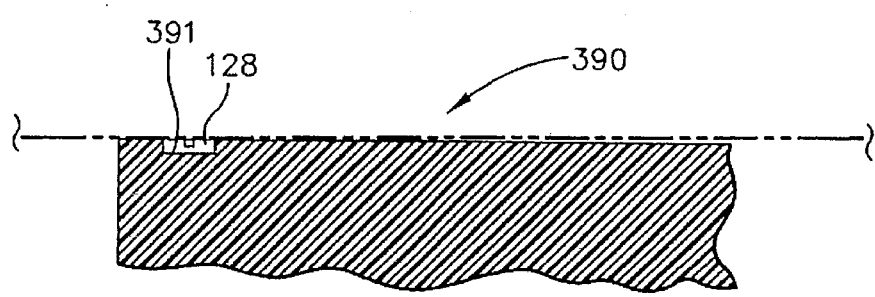
FIG. 31B is a view taken along plane 31B—31B of FIG. 31A.

FIGS. 31A and 31B are illustrations of still another embodiment 390 of the head assembly. In this embodiment the magnetic heads 128 are located in recesses 391 in a disk of the head assembly. The magnetic heads are flush with a planar surface of the head assembly and no annular ridges have been provided. The embodiment 390 of the head assembly would be the simplest to construct, however, there is no provision for precisely controlling the position of the tape as it is traversed by each magnetic head during rotation of the head assembly.

Figure 32A:
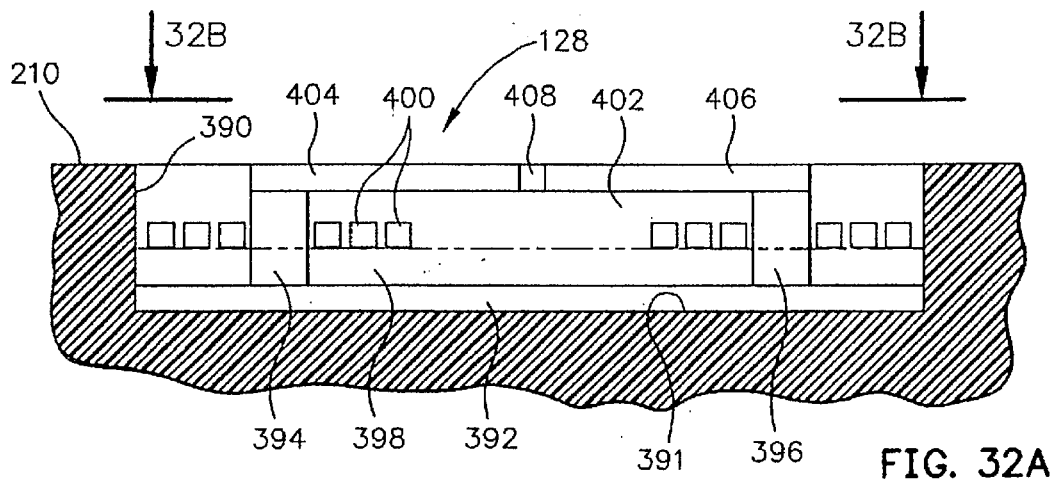
FIG. 32A is a cross-sectional view of a magnetic head in a cavity of the disk.
Figure 32B:
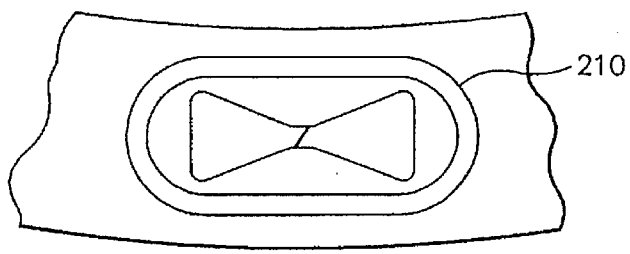
FIG. 32B is a view taken along line 32B—32B of FIG. 32A.

An exemplary construction of the magnetic head in the disk of the head assembly is illustrated in FIGS. 32A and 32B. The island 210 is provided with a recess 391 into which the magnetic head 128 is constructed. A magnetic layer 392, such as Permalloy, may be deposited in the bottom of the recess 391, such as by plating after depositing a seedlayer (not shown) or sputtering. After appropriate masking a pair of magnetic columns 394 and 396, such as Permalloy, are constructed on top of the bottom magnetic layer 392. After appropriate masking a first insulation layer 398 is layed on the bottom magnetic layer 392 about the columns 394 and 396 at about half their height. After appropriate masking and deposition of a seedlayer (not shown), conductive coils 400, such as copper, are formed on top of the first insulation layer 398. After appropriate masking a second insulation layer 402 is deposited on top of the coils 400 substantially flush with the top of the magnetic columns 394 and 396.

A pair of co-extensive magnetic layers 404 and 406, such as Permalloy, are then formed on top of the second insulation layer 402 and on top of the magnetic columns 394 and 396 so as to be magnetically connected therewith. Accordingly, the magnetic components provide a pair of pole pieces which are separated by an elongated gap 408 as illustrated in FIG. 32B. Any recess about the magnetic layers may be filled in by cap material (not shown) which may optionally slightly cover the pole pieces 404 and 406 and the gap 408. The gap 408 is preferably filled in by a suitable gap material such as aluminum oxide. If desired the thin films of the magnetic head may be constructed so that the gap of each magnetic head protrudes slightly forward of the forward surface of each island 210 for good transducing engagement of the magnetic head with a moving magnetic tape as discussed hereinabove. During the construction of each film of the magnetic head, the masking is of the entire wafer so as to protect all areas of the head assemblies from unwanted deposition. The invention has now described the construction of the magnetic heads by thin film technology on a substrate which forms the disk of each head assembly.

After completion of the magnetic heads, the wafer is appropriately masked and etched to form discrete head assemblies. Alternately, the wafer could be diced and the diced portions ground or lapped to provide the circular surface of each head assembly. The ridges 202 and 204 of each head assembly are then lapped to provide them with slopes which extend rearwardly toward the outer circular periphery of the disk. These annular rims can be lapped individually taking care not to damage projecting magnetic heads located therebetween. The integrated thin film approach to constructing head assemblies on a substrate insures that the gaps will be appropriately aligned as discussed hereinabove. Further, this construction lowers the cost of each head assembly by allowing mass production thereof at the wafer level.

Exemplary construction of recessed magnetic heads are described in several prior art references, as follows: (1) U.S. Pat. No. 4,901,177 by Lazzari; (2) IEEE Transactions on Magnetics, volume 28, No. 5, September 1992 entitled "Compatibility of Silicon Planar Heads with Conventional Thin Film Heads in Hard Disk Drives" by Autino, Lazzari, and Pisella; and (3) IEEE Transactions on Magnetics, volume 25, No. 5, September 189, entitled "A New Thin Film Head Generation IC Head" by Lazzari and Deroux-Dauphin which are incorporated by reference herein.

Figure 33D:
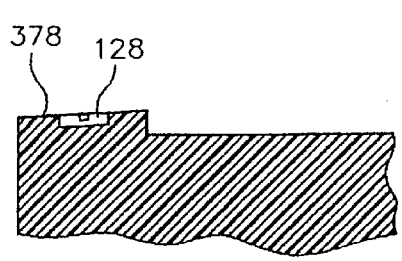
FIGS. 33A–33G are schematic illustrations of portions of various head assembly embodiments.
Figure 33A:
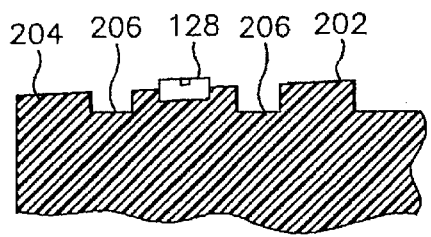
Figure 33E:
Figure 33B:
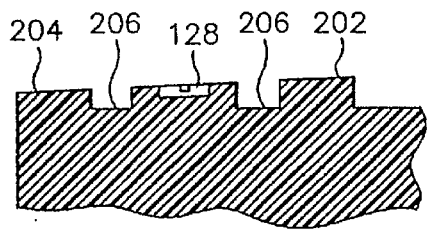
Figure 33F:
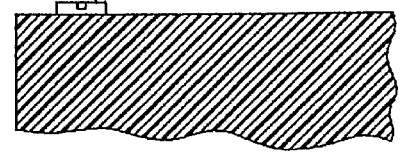

FIGS. 33A–33G are partial schematic illustrations of various embodiments of the head assembly. FIG. 33A is a schematic illustration of the preferred integrated head assembly also shown in FIGS. 6, 7, 29A, and 29B. A modification of this embodiment may include an intermediate annular ridge positioned in the annular recess 206 between the inboard and outboard annular ridges 202 and 204 in lieu of islands for the mounting of the magnetic heads. In FIG. 33A the magnetic head projects forwardly with respect to the head assembly beyond a plane formed by the forward surfaces of the inboard and outboard annular ridges. FIG. 33B differs from FIG. 33A in that the head surface of the magnetic head is co-extensive with a plane formed by the inboard and outboard annular ridges. The magnetic head can be mounted on islands between the inboard and outboard annular ridges or upon an annular ridge which is located in the recess 206 between the inboard and outboard annular ridges. All of the annular ridges may be constructed by etching a substrate or formation by thin film deposition techniques.

Figure 33C:
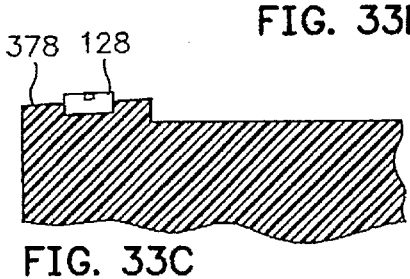

In FIG. 33C an annular ridge 378 is provided adjacent the circular periphery of the disk of the head assembly. The annular ridge is then lapped to provide its top with a rearward slope, with respect to the scanner, toward the circular periphery of the disk. The magnetic head is constructed partially within a recess within the top surface of the annular ridge with a portion of the magnetic head projecting therefrom. FIG. 33D differs from the embodiment in FIG. 33C in that the head surface of the magnetic head is flush with the forward surface of the annular ridge. After construction of the magnetic head, the annular ridge may be lapped to provide the rearwardly sloped surface, with respect to the scanner, toward the circular periphery of the disk. The embodiment shown in FIG. 33D is the same as the embodiment shown in FIGS. 30A and 30B.

Figure 33G:
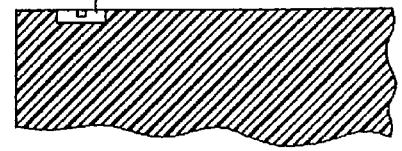

In the embodiment shown in FIG. 33E, the magnetic head is built partially within a recess of a completely flat front surface of the disk. In this embodiment the head surface of the magnetic head protrudes from the front surface of the disk. In the embodiment in FIG. 33F, the thin film magnetic head is constructed entirely on top of the flat surface of the disk which can provide the magnetic head with more protrusion than that illustrated in FIG. 33E. In FIG. 33G the magnetic head is constructed entirely within a recess within the flat disk so that the head surface of the magnetic head is flush with the front surface of the disk. The embodiment shown in FIG. 33G is the same as that shown in FIGS. 31A and 31B.

Obviously, other embodiments and modifications of the invention will occur to those of ordinary skill in the art in view of the above teachings. Therefore, the invention is to be limited only by the following claims, which include all of such embodiments and modifications when viewed in conjunction with the above specification and accompanying drawings.

We claim:

1. A sloping tape guide for an arcuately scanning tape drive, the arcuately scanning tape drive having a head assembly, the head assembly including a plurality of magnetic heads which are carried by a rotatable substantially circular disk, and the magnetic heads having gaps which are exposed at a front face of the disk for transducing contact with a magnetic tape, the tape guide comprising:

a sloping plate which has a front sloping flat surface, the front sloping flat surface being bounded by first and second longitudinal edges and first and second side edges;

the first side edge being closer to a periphery of the disk than the second side edge;

the front sloping flat surface sloping rearwardly from its first side edge to its second side edge away from the periphery of the circular disk; and said second side edge being curved concavely so that the area of the sloping flat surface progressively increases from its center towards its first and second longitudinal edges, whereby first and second longitudinal edge portions of the magnetic tape will have a longer path length than the path length at the center of the tape so as to equalize or enhance tension across the tape.

2. A sloping tape guide as claimed in claim 1 including:

the first side edge being straight and substantially symmetrical with respect to the curve of the second side edge, whereby the first side edge provides a straight wrap line for the magnetic tape and the second side edge provides a curved wrap line for the magnetic tape.

3. A sloping tape guide as claimed in claim 1 including:

the curve of the second side edge being symmetrical.

4. A sloping tape guide as claimed in claim 1 including:

a spacer plate which has a front flat surface which is bounded by first and second longitudinal edges and first and second side edges, the second side edge of the spacer plate being common with the first side edge of the sloping flat surface; and the first side edge of the spacer plate being a concave arc which is substantially concentric with a periphery of the circular disk.

5. A sloping tape guide as claimed in claim 4 including:

the slope of the front sloping flat surface of the guide plate being substantially 5 degrees.

6. A combination including the sloping tape guide of claim 1, the combination comprising:

a shroud having first and second legs which are interconnected by at least one crossbar;

the sloping tape guide being mounted on the second leg of the shroud; and a curved tape guide mounted on the first leg of the shroud diametrically opposite the sloping tape guide.

7. A combination as claimed in claim 6 including:

the curved tape guide extending forwardly of the sloping tape guide.

8. A combination as claimed in claim 7 including:

means mounted on the shroud for positioning a cartridge containing magnetic tape and a fixed tape guide so that the magnetic tape is positioned in a transducing relationship with said head assembly and in a position to wrap the tape from the fixed tape guide to the sloping tape guide.

9. A sloping tape guide as claimed in claim 1 including:

the curve of the second side edge of the front sloping flat surface being an arc which has a radius which is substantially, the same as a radius of the circular disk.

10. A sloping tape guide as claimed in claim 9 including:

the arc of the second side edge being symmetrical.

11. A sloping tape guide as claimed in claim 10 including:

the first side edge being straight and substantially symmetrical with respect to the arc of the second side edge, whereby the first side edge provides a straight wrap line for the magnetic tape and the second side edge provides a curved wrap line for the magnetic tape.

12. A sloping tape guide as claimed in claim 11 including:

a spacer plate which has a front flat surface which is bounded by first and second longitudinal edges and first and second side edges, the second side edge of the spacer plate being common with the first side edge of the sloping flat surface; and the first side edge of the spacer plate being an arc which is substantially concentric with a periphery of the circular disk.

13. A combination including the sloping tape guide of claim 12, the combination comprising:
a shroud having first and second legs which are interconnected by at least one cross bar;
the sloping tape guide being mounted on the second leg of the shroud;
a curved tape guide mounted on the first leg of the shroud diametrically opposite the sloping tape guide; and
the curved tape guide extending forwardly of the sloping tape guide.

14. A combination as claimed in claim 13 including:
means mounted on the shroud for positioning a cartridge containing magnetic tape and a fixed tape guide so that the magnetic tape is positioned in transducing contact with said head assembly and in a position to wrap the tape from the fixed tape guide to the sloping tape guide.

15. A sloping tape guide as claimed in claim 14 including:
the slope of the front sloping flat surface of the sloping plate being substantially 5° with respect to the front flat surface of the spacer plate.

16. An arcuately scanning tape drive including the sloping tape guide of claim 1, the arcuately scanning tape drive comprising:
a support;
the head assembly being rotatably mounted on the support;
the magnetic heads being located forwardly of the first side edge of the sloping flat surface so that a magnetic tape wraps directly from the first side edge of the sloping flat surface to one of the magnetic heads.

17. An arcuately scanning tape drive including the sloping tape guide of claim 1, the arcuately scanning tape drive comprising:
a support;
the head assembly being rotatable mounted on the support;
the circular disk having at least one annular ridge circumscribing a center of the disk; and
said annular ridge being located forwardly of the first side edge of the sloping flat surface so that a magnetic tape wraps directly from the first side edge of the sloping tape guide to the annular ridge of the circular disk.

18. An arcuately scanning tape drive as claimed in claim 17 including:
said plurality of magnetic heads being mounted on said annular ridge.

19. An arcuately scanning tape drive including the sloping tape guide of claim 1, the arcuately scanning tape drive comprising:
a support;
the head assembly being rotatably mounted on the support;
the circular disk having a pair of inboard and outboard annular ridges centered about a center of the disk with an annular recess therebetween;
said magnetic heads being mounted within said recess;
the outboard annular ridge having a front surface which is located forwardly of the first side edge of the sloping flat surface; and
the inboard annular ridge having a front surface which is located forwardly of the front surface of the outboard annular ridge.

20. An arcuately scanning tape drive as claimed in claim 19 including:
the front surfaces of the inboard and outboard ridges being coplanar and sloping rearwardly away from the center of the disk.

21. An arcuately scanning tape drive as claimed in claim 20 including:
the magnetic heads having gaps which extend forwardly of a plane formed by the front surfaces of the inboard and outboard ridges.

22. An arcuately scanning tape drive including the sloping tape guide of claim 1, the arcuately scanning tape drive comprising:
a support;
the circular disk being rotatably mounted on the support;
a shroud;
the shroud having first and second spaced apart legs which are connected by at least one crossbar;
the sloping tape guide being mounted on the second leg of the shroud;
a curved tape guide mounted on the first leg of the shroud substantially diametrically opposite the sloping tape guide; and
the shroud being mounted on the support about the circular disk with the sloping tape guide and the curved tape guide substantially adjacent a periphery of the circular disk.

23. An arcuately scanning tape drive as claimed in claim 22 including:
means mounted on the support for supporting a cartridge which contains the magnetic tape, the cartridge having a pair of spaced apart tape guides which guide an exposed portion of the magnetic tape at an edge of the cartridge; and
positioning means mounted on the shroud for positioning the cartridge on the support with an exposed portion of the magnetic tape wrapped forwardly from said spaced apart guides to said sloping tape guide and said curved tape guide.

24. An arcuately scanning tape drive as claimed in claim 23 including:
tape movement means mounted on the support for advancing the magnetic tape longitudinally past the circular disk; and
means for rotating the circular disk so that the magnetic heads record and read a sequence of arcuate information tracks on the magnetic tape.

25. An arcuately scanning tape drive scanner as claimed in claim 24 including:
the curve of the second side edge being an arc which has a radius which is substantially the same as a radius of the circular disk.

26. An arcuately scanning tape drive as claimed in claim 25 including:
the arc of the second side edge being symmetrical.

27. An arcuately scanning tape drive scanner as claimed in claim 26 including:
the first side edge being straight and substantially symmetrical with respect to the curve of the second side edge,
whereby the first side edge provides a straight wrap line for the magnetic tape and the second edge provides a curved wrap line for the magnetic tape.

28. An arcuately scanning tape drive as claimed in claim 27 including:

a spacer plate which has a front flat surface which is bounded by first and second longitudinal edges and first and second side edges, the second side edge of the spacer plate being common with the first side edge of the sloping flat surface; and the first side edge of the spacer being an arc which is substantially concentric with the circular disk.

29. An arcuately scanning tape drive as claimed in claim 28 including:

the magnetic heads being located forwardly of the first side edge of the sloping flat surface so that a magnetic tape wraps directly from the first side edge of the sloping flat surface to the front face of the circular disk.

30. An arcuately scanning tape drive as claimed in claim 28 including:

at least one annular ridge on the front face of the circular disk which projects forwardly therefrom and which circumscribes a center thereof: and said annular ridge also projecting forwardly of the first side edge of the sloping flat surface so that a magnetic tape wraps directly from the first side edge of the sloping flat surface to the annular ridge of the circular disk.

31. An arcuately scanning tape drive as claimed in claim 30 including:

said plurality of magnetic heads being mounted on said annular ridge.

32. An arcuately scanning tape drive as claimed in claim 28 comprising:

the circular disk having a pair of inboard and outboard annular ridges centered about a center of the disk with an annular recess therebetween;

said magnetic heads being mounted within said recess;

the outboard annular ridge having a front surface which is located forwardly of the first side edge of the sloping flat surface; and the inboard annular ridge having a front surface which is located forwardly of the front surface of the outboard annular ridge.

33. An arcuately scanning tape drive as claimed in claim 32 including:

the front surfaces of the inboard and outboard ridges being coplanar and sloping rearwardly away from the center of the disk.

34. An arcuately scanning tape drive as claimed in claim 33 including:

the magnetic heads having gaps which extend forwardly of a plane formed by the front surfaces of the inboard and outboard ridges.

35. A sloping tape guide for an arcuately scanning tape drive, the arcuately scanning tape drive having a head assembly, the head assembly including a plurality of magnetic heads which are carried by a rotatable element, the rotatable element having a substantially front flat surface, and the magnetic heads having gaps which are exposed at the front flat face of the element for transducing contact with a magnetic tape, the sloping tape guide comprising:

a guide plate which has a sloping flat surface, the sloping flat surface being bounded by first and second longitudinal edges and first and second side edges;

the first side edge being closer to a periphery of the rotatable element than the second side edge;

the sloping flat surface sloping rearwardly with respect to the front flat surface from said first side edge to said second side edge;

the sloping flat surface of the guide plate having variable longitudinally extending lengths from its first side edge to its second side edge; and said variable lengths providing the magnetic tape with variable path lengths across a width of the tape between the first and second side edges of the guide plate.

36. A sloping tape guide as claimed in claim 35 including:

the first side edge of the guide plate being substantially straight; and the second side edge of the guide plate being substantially concave, whereby paths of the magnetic tape along the sloping flat surface progressively increase across the magnetic tape from a center of the width of the tape toward first and second longitudinal edges of the tape.

37. A sloping tape guide as claimed in claim 35 including:

a spacer plate which has a front flat surface which is bounded by first and second longitudinal edges and first and second side edges, the second side edge of the spacer plate being common with the first side edge of the sloping flat surface; and the first side edge of the spacer plate being a concave arc which is substantially concentric with a periphery of the circular disk.

38. A sloping tape guide as claimed in claim 37 including:

the first side edge of the guide plate being substantially straight; and the second side edge of the guide plate being substantially concave, whereby paths of the magnetic tape along the sloping flat surface progressively increase across the magnetic tape from a center of the tape toward first and second longitudinal edges of the tape.

39. A combination including the sloping tape guide of claim 35, the combination comprising:

a shroud having first and second legs which are interconnected by at least one crossbar;

the sloping tape guide being mounted on the second leg of the shroud; and a curved tape guide mounted on the first leg of the shroud diametrically opposite the sloping tape guide.

40. A combination as claimed in claim 39 including:

the curved tape guide being located forwardly of the sloping tape guide.

41. A sloping tape guide as claimed in claim 35 including:

the rotatable element being a circular disk; and the curve of the second side edge of the sloping flat surface being an arc which has a radius which is substantially the same as a radius of the circular disk.

42. A sloping tape guide as claimed in claim 41 including:

the arc of the second side edge having a center point which is located on said second side edge; and the arc of the second side edge being symmetrical with respect to said center point.

43. A sloping tape guide as claimed in claim 42 including:

a spacer plate which has a front flat surface which is bounded by first and second longitudinal edges and first and second side edges, the second side edge of the spacer plate being common with the first side edge of the sloping flat surface; and the first side edge of the spacer plate being an arc which is substantially concentric with a periphery of the circular disk.

44. A combination including the sloping tape guide of claim 43, the combination comprising:

a shroud having first and second legs which are interconnected by at least one cross bar;

the sloping tape guide being mounted on the second leg of the shroud;

a curved tape guide mounted on the first leg of the shroud diametrically opposite the sloping tape guide; and the curved tape guide extending forwardly of the sloping tape guide.

45. An arcuately scanning tape drive including the sloping tape guide of claim 35, the arcuately scanning tape drive comprising:

a support;

the head assembly being rotatably mounted on the support; and the magnetic heads being located forwardly of the first side edge of the sloping flat surface so that a magnetic tape wraps directly from the first side edge of the sloping flat surface to one of the magnetic heads.

46. An arcuately scanning tape drive including the sloping tape guide of claim 35, the arcuately scanning tape drive comprising:

a support;

the head assembly being rotatably mounted on the support;

said element being a circular disk;

the circular disk having at least one annular ridge circumscribing a center of the disk; and said annular ridge being located forwardly of the first side edge of the sloping flat surface so that the magnetic tape wraps directly from the first side edge of the sloping flat surface to the annular ridge of the circular disk.

47. An arcuately scanning tape drive as claimed in claim 46 including:

said plurality of magnetic heads being mounted on said annular ridge.

48. An arcuately scanning tape drive including the sloping tape guide of claim 35, the arcuately scanning tape drive comprising:

a support;

the head assembly being rotatably mounted on the support;

said element being a circular disk;

the circular disk having a pair of inboard and outboard annular ridges centered about a center of the disk with an annular recess therebetween;

said magnetic heads being mounted within said recess;

the outboard annular ridge having a front surface which is located forwardly of the first side edge of the sloping flat surface; and the inboard annular ridge having a front surface which is located forwardly of the front surface of the outboard annular ridge.

49. An arcuately scanning tape drive as claimed in claim 48 including:

the front surfaces of the inboard and outboard ridges being coplanar and sloping rearwardly away from the center of the disk.

50. An arcuately scanning tape drive as claimed in claim 49 including:

the magnetic heads having gaps which extend forwardly of a plane formed by the front surfaces of the inboard and outboard ridges.

51. An arcuately scanning tape drive including the sloping tape guide of claim 35, the arcuately scanning tape drive comprising:

a support;

said element being a circular disk;

the circular disk being rotatably mounted on the support;

a shroud;

the shroud having first and second spaced apart legs which are connected by at least one crossbar;

the sloping tape guide being mounted on the second leg of the shroud;

a curved tape guide mounted on the first leg of the shroud substantially diametrically opposite the sloping tape guide; and the shroud being mounted on the support about the circular disk with the sloping tape guide and the curved tape guide substantially adjacent a periphery of the circular disk.

52. An arcuately scanning tape drive as claimed in claim 51 including:

means mounted on the support for supporting a cartridge which contains the magnetic tape, the cartridge having a pair of spaced apart tape guides which guide an exposed portion of the magnetic tape at an edge of the cartridge; and positioning means mounted on the shroud for positioning the cartridge on the support with an exposed portion of the magnetic tape wrapped forwardly from said spaced apart guides to said sloping tape guide and said curved tape guide.

53. An arcuately scanning tape drive as claimed in claim 52 including:

tape movement means mounted on the support for advancing the magnetic tape longitudinally past the circular disk; and means for rotating the circular disk so that the magnetic heads record and read a sequence of arcuate information tracks on the magnetic tape.

54. An arcuately scanning tape drive scanner as claimed in claim 53 including:

the curve of the second side edge being an arc which has a radius which is substantially the same as a radius of the circular disk.

55. An arcuately scanning tape drive as claimed in claim 54 including:

the arc of the second edge having a center point which is located on said second side edge; and the arc of the second side edge being symmetrical with respect to said center point.

56. An arcuately scanning tape drive scanner as claimed in claim 55 including:

the first side edge being straight and substantially symmetrical with respect to the curve of the second side edge, whereby the first side edge provides a straight wrap line for the magnetic tape and the second edge provides a curved wrap line for the magnetic tape.

57. An arcuately scanning tape drive as claimed in claim 56 including:

a spacer plate which has a front flat surface which is bounded by first and second longitudinal edges and first and second side edges, the second side edge of the spacer plate being common with the first side edge of the sloping flat surface; and the first side edge of the spacer being an arc which is substantially concentric with the circular disk.

58. An arcuately scanning tape drive as claimed in claim 57 including:

the magnetic heads being located forwardly of the first side edge of the sloping flat surface so that a magnetic tape wraps directly from the first side edge of the sloping flat surface to the front face of the circular disk.

59. An arcuately scanning tape drive as claimed in claim 57 including:

at least one annular ridge on the front flat surface of the circular disk which circumscribes a center of the disk; and said annular ridge projecting forwardly of the first side edge of the sloping flat surface so that a magnetic tape wraps directly from the first side edge of the sloping flat surface to the annular ridge of the circular disk.

60. An arcuately scanning tape drive as claimed in claim 59 including:

said plurality of magnetic heads being mounted on said annular ridge.

61. An arcuately scanning tape drive as claimed in claim 57 comprising:

the circular disk having a pair of inboard and outboard annular ridges centered about a center of the disk with an annular recess therebetween;

said magnetic heads being mounted within said recess;

the outboard annular ridge having a front surface which is located forwardly of the first side edge of the sloping flat surface; and the inboard annular ridge having a front surface which is located forwardly of the front surface of the outboard annular ridge.

62. An arcuately scanning tape drive as claimed in claim 61 including:

the front surfaces of the inboard and outboard ridges being coplanar and sloping rearwardly away from the center of the disk.

63. An arcuately scanning tape drive as claimed in claim 62 including:

the magnetic heads having gaps which extend forwardly of a plane formed by the front surfaces of the inboard and outboard ridges.

\* \* \* \* \*